United States Patent [19]

Higashihara et al.

[11] Patent Number: 5,273,105

[45] Date of Patent: Dec. 28, 1993

[54] AIR CONDITIONING APPARATUS FOR AN AUTOMOBILE

[75] Inventors: Akhito Higashihara, Chiryu; Hiroshi Nonoyama, Toyota; Koichi Ito, Kariya; Michihiko Kamiya, Honda, all of Japan

[73] Assignee: Nippondenso Co., Ltd., Kariya, Japan

[21] Appl. No.: 856,985

[22] Filed: Mar. 24, 1992

[30] Foreign Application Priority Data

Mar. 26, 1991 [JP] Japan .................................. 3-087748
Aug. 8, 1991 [JP] Japan .................................. 3-224705

[51] Int. Cl.$^5$ ............................................. F25B 29/00
[52] U.S. Cl. ..................................... 165/12; 237/2 A;
237/12.3 B; 236/91 F; 236/46 F; 165/43;
165/22; 251/129.05
[58] Field of Search .................... 237/12.3 B, 2 A;
251/129.05; 137/625.29; 165/42, 43, 12; 236/91 F, 46 F

[56] References Cited

U.S. PATENT DOCUMENTS

| | | | |
|---|---|---|---|
| 4,058,255 | 11/1977 | Linder et al. | 237/12.3 B |
| 4,189,093 | 2/1980 | Schnaibel et al. | 236/37 |
| 4,386,734 | 6/1983 | Weible | 237/12.3 B |
| 4,417,688 | 11/1983 | Schnaibel et al. | 236/91 |
| 4,462,541 | 7/1984 | Hansen | 237/12.3 B |
| 4,520,258 | 5/1985 | Grohmann | 237/12.3 B |
| 4,750,671 | 6/1988 | Heinle et al. | 237/12.3 B |
| 4,821,792 | 4/1989 | Bednarek | 237/12.3 B |

FOREIGN PATENT DOCUMENTS

| | | | |
|---|---|---|---|
| 425454 | 5/1991 | European Pat. Off. | |
| 2144501 | 3/1973 | Fed. Rep. of Germany | 237/12.3 B |
| 52-11538 | 1/1977 | Japan | |
| 0008015 | 1/1988 | Japan | 237/12.3 B |
| 2127182 | 4/1984 | United Kingdom | |

OTHER PUBLICATIONS

Manuel for New Model Car of Toyota Century published Oct., 1982.

Primary Examiner—John K. Ford
Attorney, Agent, or Firm—Cushman, Darby & Cushman

[57] ABSTRACT

A heater core 21 is connected to an engine cooling water line via an inlet passageway 43 and a return passageway 45. A first valve 25a is provided for controlling the amount of high temperature water introduced to the heater core 21, and a second valve 25b is provided for a re-circulation of low temperature water that has passed through the heater core, via a re-circulation passageway 46. The amount of high temperature engine cooling water supplied to the heater core 21 and the amount of low temperature cooling water from the heater core 21 passed through the return passageway 46 are controlled by an on-off manner control of the first and second valves 25a and 25b, respectively, and thus a ratio of a mixture of the high temperature water and the low temperature water, which corresponds to a time average value of the temperature of the cooling water introduced into the heater core, is controlled in accordance with a duty ratio of the on-off signals operating the valves 25a and 25b. This on-off control of the valves 25a and 25b prevents a depositing of impurities at small valve gaps otherwise obtained between the valves and the respective valve seats. Furthermore, under particular conditions, the frequency of the on-off cycle can be reduced, to thereby prolong the service life of the device. A by-pass passageway 47 is provided for preventing water hammer.

4 Claims, 19 Drawing Sheets

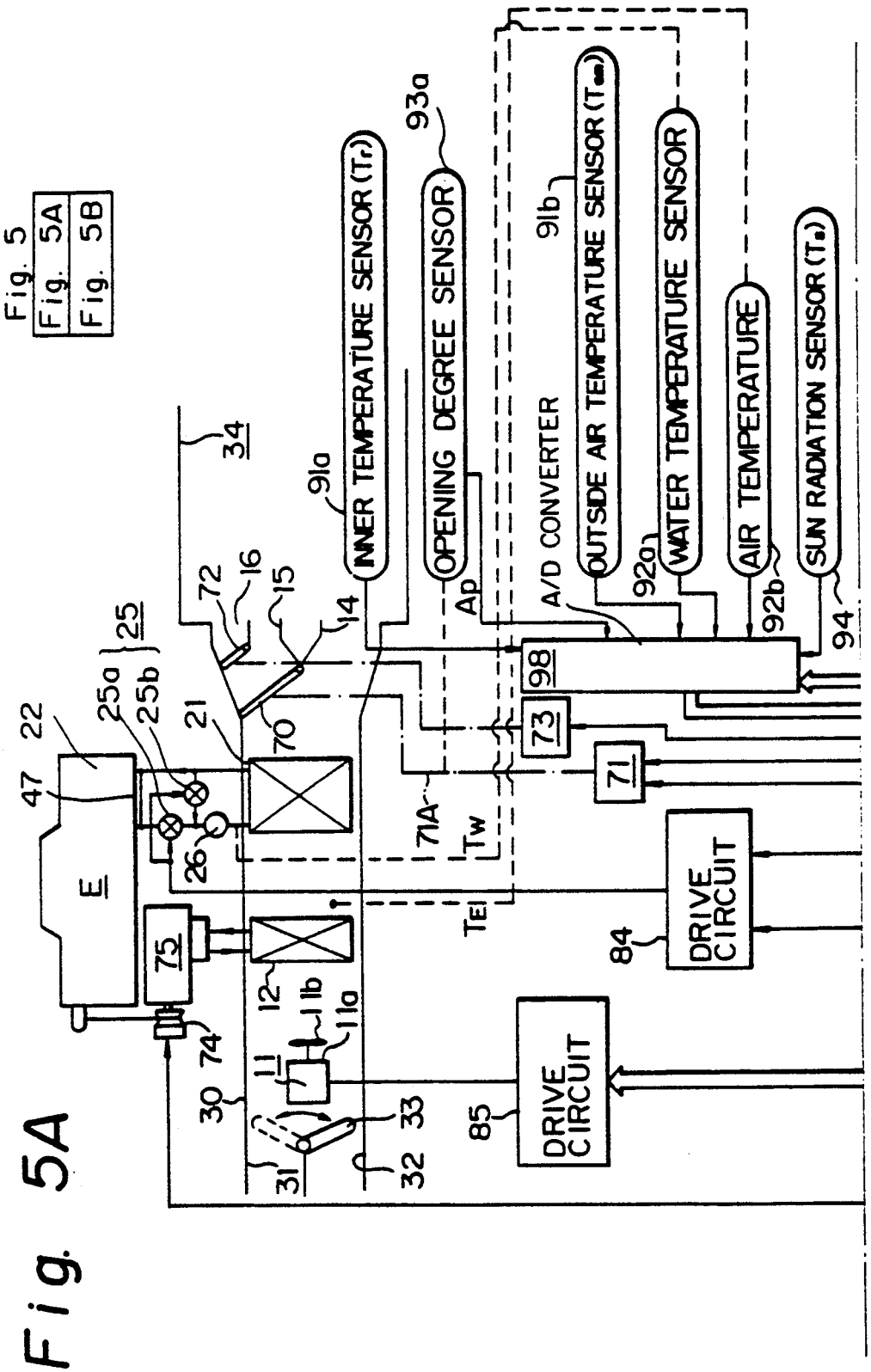

AIR CONDITIONING APPARATUS FOR AN AUTOMOBILE

BACKGROUND OF THE INVENTION

1. Field of the Invention

The present invention relates to an air conditioning apparatus having a heater core through which an engine cooling water is passed, and a blower for obtaining a flow of an intake air into the heater core to thereby subject the air flow to a heat exchange operation with the engine cooling water and obtain a predetermined temperature of the air, and more particularly, to such an apparatus wherein the temperature of the cooling water passing through the heater core is controlled, to thereby obtain a desired control of the temperature of the space to be air-conditioned.

2. Description of the Related Art

Two types of air conditioning apparatus are known; an air-mix type and a re-heating type. The re-heating type is divided into two types of temperature control systems; a hot water amount control type and a hot water temperature control type. The present invention relates to an improvement in the temperature control system of the hot water temperature control type. In this type of the air conditioning apparatus, a heater core is arranged in a re-circulation passageway for an engine cooling water diverted from and returned to the engine, and valves are provided for controlling the amount of hot engine cooling water diverted from the engine while maintaining a constant total amount of recirculated water in the heater core re-circulation passageway.

SUMMARY OF THE INVENTION

An object of the present invention is to provide an air conditioning apparatus for a vehicle, in which apparatus a depositing of impurities on a valve is prevented, and in which a distribution in a cabin of air at a uniform temperature is obtained, to thereby ensure an effective air conditioning of the cabin.

Another object of the present invention is to provide an air conditioning apparatus by which a generation of water hammer is prevented.

Still another object of the present invention is to provide an air conditioning apparatus for a vehicle, which apparatus is able to reduce temperature differences in the air flow emitted from a heater core.

The present invention provides a heating apparatus arranged in an air duct of an air conditioning system for an automobile provided with an internal combustion engine having an engine cooling water re-circulation passageway, the heating apparatus comprising:

a heater core located in the air duct for causing a heat exchange with an air flow and heating the air;

a first passageway for diverting an amount of cooling water from the engine cooling water recirculating passageway, and directing same to the heater core;

a water pump arranged in the first passageway for obtaining a forcible flow of the cooling water into the heater core;

a second passageway for re-introducing engine cooling water that has passed through the heater core, into the engine recirculating passageway;

a third passageway connecting the second passageway with the first passageway at a location upstream of the water pump, to thereby obtain a flow of cooling water from the second passageway to the first passageway;

first valve means for controlling the flow of the cooling water in the first passageway, the first valve means having a first position allowing all of the cooling water to be introduced into the heater core, and a second position completely blocking an introduction of the cooling water into the heater core;

a fourth passageway connecting the second passageway with the first passageway at a location upstream of the first valve means;

second valve means for controlling the flow of the cooling water between the second and third passageways, the second valve means having a first position completely blocking an introduction of the cooling water that has passed through the heater core, into the third passageway, and a second position allowing an amount of the cooling water that has passed through the heater core to be returned to the first passageway via the third passageway, and;

means, responsive to a cooling requirement of the cooling apparatus, for obtaining a repetition of a unified operation of the first and second valve means, under a desired cycle, between a first state wherein the first and second valve means are at the first positions thereof, respectively, and allowing all of the high temperature water from the engine to be introduced into the heater core, while preventing the low temperature cooling water from being re-introduced into the heater core, and a second state wherein the first and second valve means are at the second positions thereof, respectively, and allowing the low temperature water that has passed through the heater core to be re-introduced into the heater core, while preventing the high temperature engine cooling water from being introduced into the heater core, to thereby obtain a desired temperature of the engine cooling water introduced into the heater core.

According to the invention, the first and second valve members are moved between respective fully open positions and fully closed positions in response to on-off signals, and thus the valve members are prevented from being maintained in a slightly open position. As a result, a depositing of impurities is prevented on small gaps otherwise created by the slightly opened valve members, and thus the durability of the valve device is enhanced.

A passage of a constant amount of fluid through the heater core is always obtained, regardless of whether the first and second valve members are open or closed, and as a result, a thermal capacity of the cooling medium introduced into the heater core is increased and thus the temperature difference of the cooling medium at the inlet and at the outlet of the heater core is kept at a low value. Accordingly, the temperature of the emitted air has only a small dependency on the location of the heater core, whereby the air conditioning efficiency is increased.

Furthermore, the third and fourth passageways can reduce the pressure change caused by the on-off operation of the first valve means, to thus prevent the occurrence of water hammer and thereby increase the durability of the valve device.

According to another aspect of the present invention, the control means comprise:

means responsive to an air conditioning requirement for calculating a thermal load applied to the heater core;

means, responsive to the calculated thermal load, for calculating a duty ratio, which is a ratio of the duration of one of the first and second states to the duration of one cycle, which is a sum of the duration of the first and the second states during one cycle of the operation, and;

means for generating an electric signal having a calculated duty ratio, and applying that signal to the first and second valve means so that unified repeated operations of the first and second valve between the first and the second states thereof are obtained under the calculated duty ratio.

This embodiment enables the construction of the device for generating the on-off signal to be simplified. Furthermore, these means can be constructed by a digital computer for operating the valves, which is advantageous in that the construction thereof for operating the valves is simplified because an analogue-to-digital conversion necessary to the prior art construction is omitted.

According to another aspect of the invention, the apparatus further comprises means, responsive to the calculated thermal load, for calculating a duration of one cycle of the on-off signals in such a manner that the length of the one cycle is increased as the thermal load is reduced.

When a thermal load is small, the amount of heat exchanged per unit of time between the heater core and the air is small, and accordingly, the degree of cooling of the cooling water is small, and thus the temperature difference is small between a time for which the low temperature cooling fluid is recirculated via the heater core and a time for which the high temperature water is supplied to the heater core. Therefore, a longer on-off period can obtain a small variation of the temperature of the emitted air, and as a result, a highly efficient air conditioning is obtained and the frequency of the on-off signal is reduced, to thus increase the life of the valve device.

BRIEF DESCRIPTION OF THE DRAWINGS

FIGS. 5A and 5B are a schematic view of the air conditioning system according to the present invention, when using an electric control system;

FIG. 8-(b) shows the operation of the valve device when de-energized;

FIG. 8-(c) shows the operation of the valve device when energized;

DESCRIPTION OF THE PREFERRED EMBODIMENTS

The problem to be solved by the present invention will be explained with reference to FIGS. 1 to 4.

Figure 1:
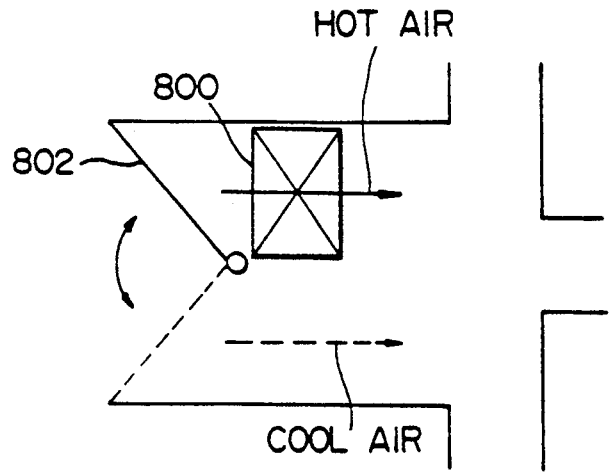
FIG. 1 is a general view of an air mix type heating apparatus of the prior art.

In the air mix type air conditioning apparatus, which is conventional and is shown in FIG. 1, a low temperature air obtained at a cooling unit is partly diverted to a heater core 800 to obtain a high temperature air, which is mixed with the remaining low temperature air that has bypassed the heater core 800, whereby a desired temperature of the mixed air is obtained. To obtain the desired temperature of the mixed air, an air mix damper 802 is provided for obtaining a desired ratio of the amount of low temperature air to the amount of high temperature air.

The air-mix type air conditioning apparatus suffers from a drawback in that a space is required for allowing a movement of the air mix damper 802 between a position shown by a solid line and a position shown by a dotted line, which increases the size of the air conditioning apparatus and thus is disadvantageous, since space in the engine room for storing the air conditioning apparatus is limited. It is possible to reduce the size of the air conditioning apparatus so that it can be installed in the limited engine room, but this solution would automatically reduce the volume of the heater core 800 for heating a part of the cooling water from the cooling unit, resulting in an increased flow resistance when the air conditioning apparatus is under a passenger leg mode in which the air flow is directed toward the legs of passengers.

In the re-heating type air condition apparatus, all of the low temperature air from the cooling unit is introduced into a heater core and re-heated, to thus obtain a flow of air having a desired temperature. The re-heating type air conditioning apparatus has an advantage over the air-mix type in that the size thereof can be reduced. Furthermore, even if the space for installing same in the engine room is limited, the reduction of the size of the heater core is minimized, resulting in a lower flow resistance of the heater core when obtaining a desired air temperature.

Figure 2:
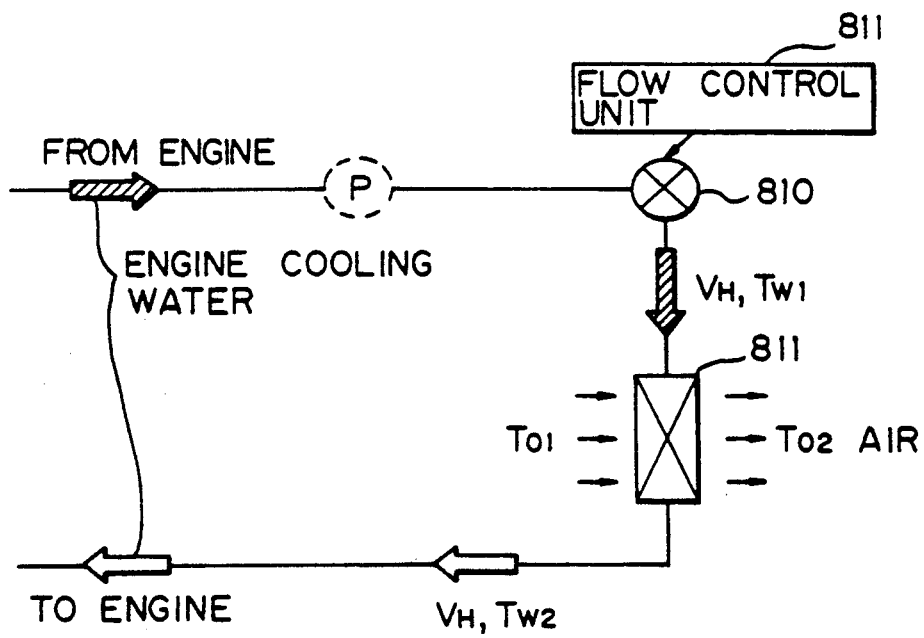
FIG. 2 is a general view of a hot water amount control type heating apparatus of the prior art.

The re-heating type air conditioning apparatus is provided with a temperature control system. Two types of temperature control units are used; a hot water flow amount control type and a hot water temperature control type. The hot water flow amount control type, as shown in FIG. 2, is provided with a flow control valve 810 arranged in a passageway carrying engine cooling water diverted from the engine, and a control means 811 for obtaining an analogue control of the degree of opening of the flow control valve 810, or for obtaining a digital signal having a desired on-off duty ratio, to thereby acquire a desired control of the heat applied to the heater core 811 per unit time. The analogue control type device is used in Japan, and the digital type device is used in some countries outside Japan and is disclosed in Japanese Unexamined Patent Publication No. 56-116514.

Figure 3:
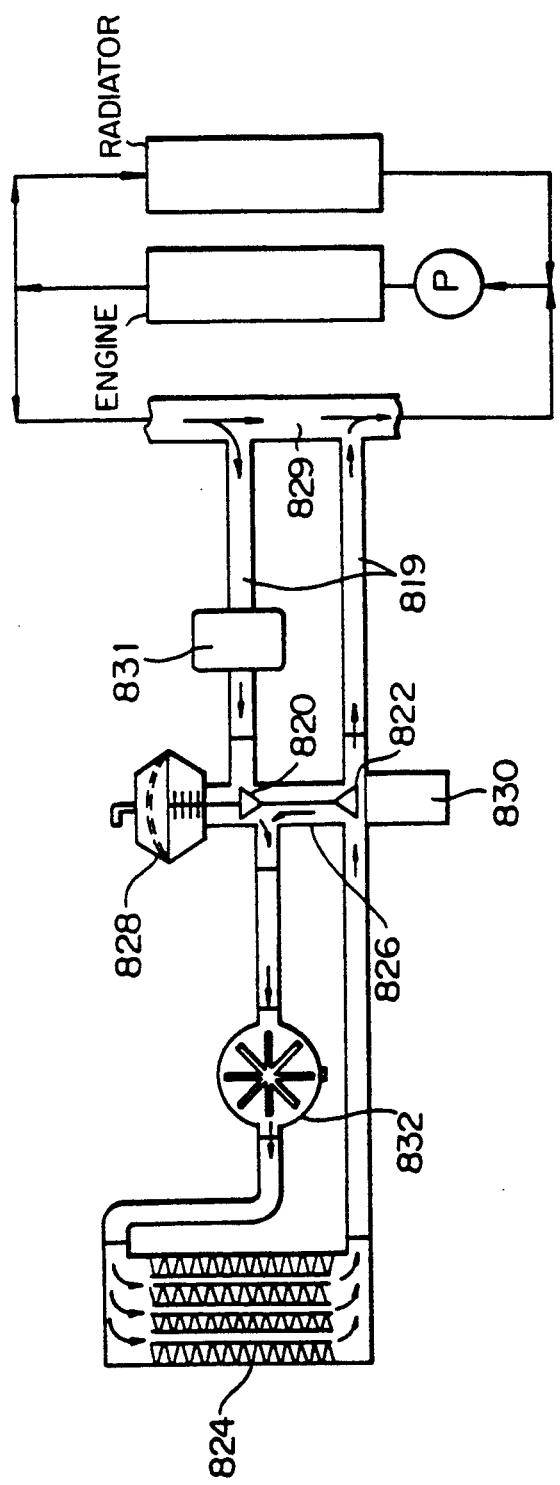
FIG. 3 shows an air conditioning system for an automobile provided with a hot air temperature control type heating apparatus with an analogue hot water temperature control device.

The hot water temperature control type, as shown in FIG. 3, is provided with a heater passageway 819 for carrying engine cooling water, a pair of valves 820 and 822 for controlling the ratio between the amount of engine cooling water diverted from the engine to the heater core 824 and the amount of the engine cooling water that has passed through the heater core 824 and is recirculated to the heater core 824 via a re-circulation passageway 826, a vacuum actuator 828 connected to the valve members 820 and 822, and an analogue control device for controlling the degree of opening of the valves 820 and 822, for controlling the temperature of the cooling water introduced into the heater core 824 and subjected to a heat exchange with the outside air to be conditioned. In this system, the temperature of the heater core 824 is controlled in accordance with the ratio of the amount of the high temperature cooling water diverted from the engine to the amount of the low temperature cooling water recirculated from the heater core 824. In the type of analogue control device produced by the assignee of this application, the heater passageway 819 is provided for diverting hot water from the engine, and for returning cold water having been subjected to a heat exchange at the heater core 824 to the engine. Furthermore, the bypass passageway 829 is provided for bypassing the heater passageway 819 at the upstream and downstream ends thereof to thereby maintain the cooling water introduced into the heater passageway 819 at a constant temperature, regardless of the rotational speed of the engine.

Figure 4:
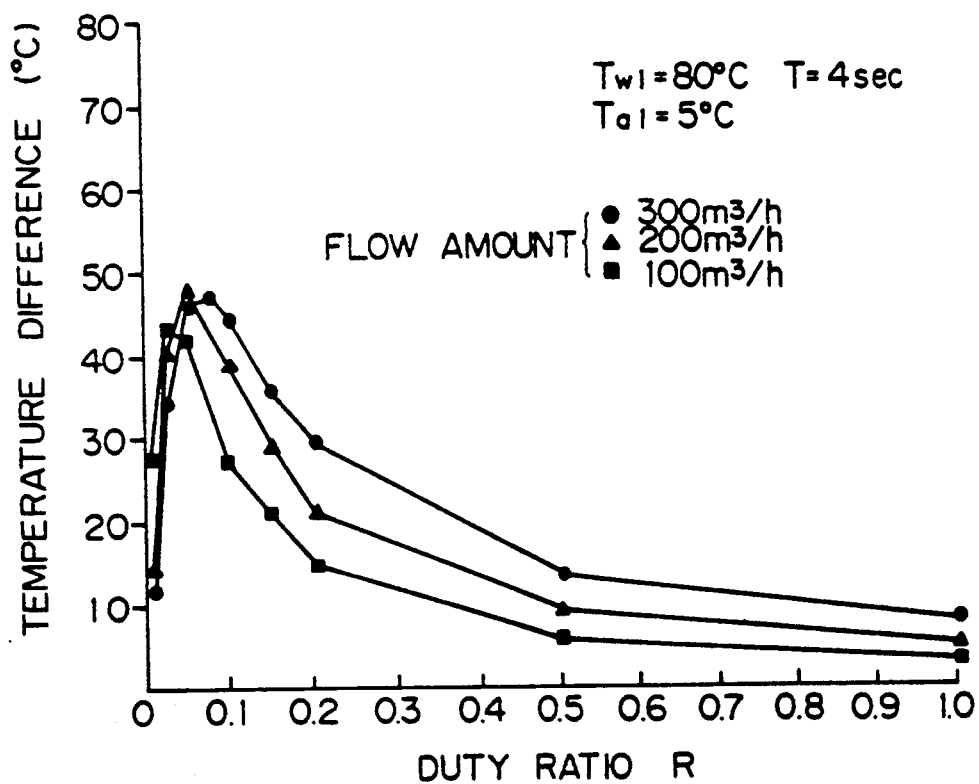
FIG. 4 shows the relationships between a duty ratio and a temperature distribution obtained by the apparatus shown in FIG. 2.

In the hot water amount control type shown in FIG. 2, the smaller the duty ratio of the control signal of the flow control valve, the larger the decrease in an average amount of cooling water introduced into the heater core, resulting in a small specific thermal volume, and as a result, a large temperature difference is created between the cooling water inlet and the cooling water outlet of the heater core 811, as shown in FIG. 4. The large difference in the temperature along the heater core causes local changes in the temperature of the air, and further, the on-off control of the flow control valve may generate water hammer cycles, which shorten the service life of the heater core.

In the hot water temperature control type as shown in FIG. 3, the ratio of the amount of hot water to the amount of cool water is controlled, while maintaining the total amount of water to be recirculated in the heater core 824 unchanged, which prevents a reduction of the specific thermal volume. As a result, in comparison with the hot water amount control type, the hot water temperature control type is advantageous in that a reduction of a temperature difference of the cooling water in the heater core at the inlet and at the outlet thereof is obtained.

Nevertheless, in the hot water temperature control type shown in FIG. 3, the low temperature of the blown air is obtained by a small degree of opening of a valve member 820 controlling the amount of high temperature water diverted from the engine and introduced via the heater passageway to the heater core 824. The engine cooling water inevitably includes impurities, such as sand from moulding, dust, and a sludge of iron phosphatic acid caused by a chemical reaction of an antifreeze agent with the inner wall of the cylinder block, and these impurities can be deposited on the small opening of the valve and adversely affect the flow control. A filter 831 can be provided in the heater passageway 819, for removing such impurities, but this may increase the flow resistance due to a clogging of the filter 831 after prolonged use. Furthermore, to obtain a desired function such that a ratio between the amount of high temperature cooling water diverted into the heater core from the engine and the amount of low temperature cooling water emitted from the heater core and mixed with the high temperature cooling water is only determined by the degree of opening of the valve member 820 and is not dependent on the engine speed, a small pressure difference should be maintained between the inlet and outlet of the heater passageway 819 carrying the cooling water from the cooling water re-circulation system of the engine. Namely, a relationship between the amount of cooling water flowing to the heater core 824, which is proportional only to the degree of opening of the valve 820, is obtained when the pressure causing the flow of cooling water is controlled only by a pump 832 in the heater passageway. Accordingly, the hot water temperature control type, wherein the ratio of the amount of high temperature water to the amount of low temperature water is analogue-controlled by a degree of opening of the valve, must be provided with the bypass passageway 829 for connecting the heater passageway 819 at the inlet and outlet thereof.

Furthermore, the analogue control of the degree of opening of the valves requires the use of a feedback control system, for obtaining an actual value of the opening to the target value thereof, which makes the system complicated. Still further, a sensor such as a potentiometer 830 for detecting the degree of opening of the valves 820 and 822 is required.

In view of the above difficulties in the prior art techniques, the inventors found that a two-position control of the valve members between an open position and a closed position allows the degree of opening to be increased in the open position, which prevents a depositing of the impurities between the valve member and the valve seat. In this two-position valve control, the average value of the temperature of the heater core is determined merely by a ratio of a duration of a time for which the high temperature cooling water from the engine is introduced into the heater core to a duration of a time for which the low temperature cooling water that has passed through the heater core is re-introduced into the heater core. This makes the bypass passageway inevitable in the prior art basically unnecessary. According to tests made by the inventors, the on-off control of valves according to the present invention obtained a desired control characteristic without a provision of the bypass passage (corresponding to 829 in FIG. 20).

Furthermore, it is well-known to those skilled in this art that water hammer, which is apt to be generated in the hot water amount control type shown in FIG. 2, is not usually generated in the hot water temperature control type, since a heater passageway (819 in FIG. 3) is connected in parallel to an engine cooling water passageway. Nevertheless, the tests made by the inventors found for the first time that water hammer can still be generated in such a hot water temperature control type, and therefore, the inventors solution to the prior art problem is that the provision of an on-off control of the valves, for controlling the ratio of the hot water to the cold water, together with the provision of the bypass passageway, will provide an ideal temperature control characteristic while preventing an occurrence of water hammer.

GENERAL CONSTRUCTION OF THE EMBODIMENT

Figure 5B:
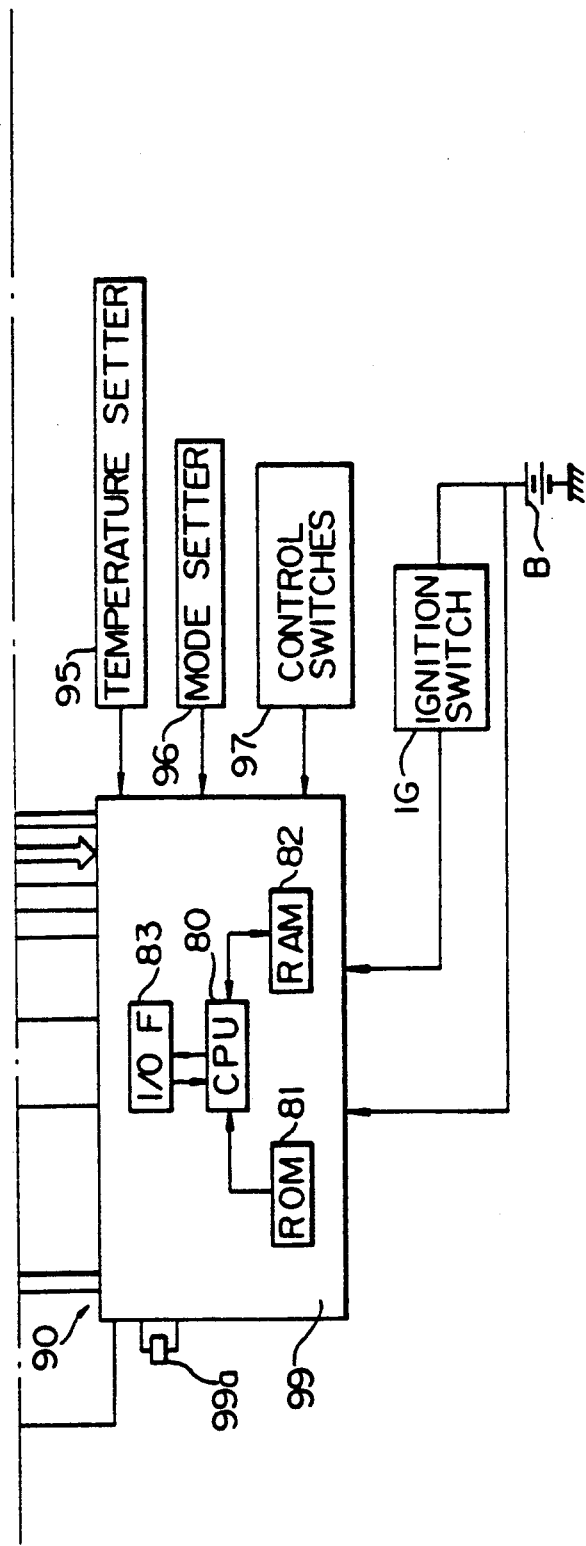

FIGS. 5A and 5B are general views of an air conditioning apparatus for a vehicle according to the present invention, wherein 30 denotes an air duct having a first end open to the outside atmosphere and a second end open to a cabin of the vehicle. The second end of the air duct 30 is provided with a lower outlet (i.e., Leg mode outlet) 14, an upper outlet (i.e., Ventilation or Face mode outlet) 15 and a defroster outlet 16, open to respective locations of a cabin 34 of the vehicle. Arranged in the air duct 30 are a switching gate 33, a blower 11 arranged downstream of the gate 33, an evaporator 12 arranged downstream of the blower 11, a heater core 21 arranged downstream of the heater core 21, a switching gate 70 arranged downstream of the heater core 21, and a switching gate 72 arranged downstream of the switching gate 70. The switching gate 33 is manually operated and can be moved between a position shown by a solid line, at which an outside air passageway 31 is opened for an introduction of outside air while closing a re-circulation passageway 32, and a position shown by a dotted line, at which the recirculating passageway 32 is opened for a re-circulation of air from the cabin 34 while closing the outside passageway 31. The blower 11 sucks air from the outside air passageway 31 or the re-circulation passageway 32 into the evaporator 12. The amount W of the air flow generated by the blower 11 is controlled in accordance with the engine rotational speed. The evaporator 12 together with a compressor 75, a not shown condenser and a not shown expansion valve 34 construct a refrigerating system for creating a refigeration cycle of a refrigerant for carrying out a heat exchange of the refrigerant with the air flow, for cooling same before it is introduced into the heater core 21. As well known the compressor 75 is provided with an electromagnetic clutch 74 controlled by an electric control device 90, whereby the compressor 75 is selectively rotated by the crankshaft of the engine.

The heater core 21 has a heat exchange passageway for carrying the engine cooling water and a heat exchange passageway for carrying the refrigerant, and these passageways are arranged in such a manner that a heat exchange between the hot engine cooling water from the engine and the cooled air from the evaporator 12 is carried out, to thereby obtain a desired temperature of the air flow directed to the switching gate 70. The switching gate 70 is connected to a servo motor 71 as an actuator. When the servo motor 71 is in the zero position, the switching gate 70 is in the basic position thereof, as shown by the solid line in FIG. 5, wherein the mixed air flow in the air duct 30 is introduced into the cabin 34 via the Heat mode outlet 14 of the air duct 30. In this Heat mode position of the switching gate 70, the hot air flow is diverted into the vehicle cabin 34 and toward the legs of the passengers, from the outlet 14. The switching gate 70 can be operated together with the switching gate 72, for introducing the mixed air into the cabin 34 via the upper (Face or Ventilation mode) outlet 15 only, or via both the outlet 15 and the lower (Leg or Heat mode) outlet 14, or for introducing the mixed air into the cabin via the Defroster outlet 16 of the air duct 30. Namely, the switching gates 70 and 72 can be selectively positioned at the Ventilation mode, the Bi-level mode or the Defroster mode. Noted, the switching gate 70 is connected to the servo motor 71 controlled by the controller 90, whereby the switching gate 70 is selectively moved upward to any of the Ventilation mode, the Bi-level mode or the Defroster mode. Furthermore, the switching gate 72 is connected to the servo motor 73 controlled by the controller 90, whereby the switching door 72 is selectively moved upward or downward to any of the Ventilation mode, the Bi-level mode or the Defroster mode.

The control circuit 90 is provided with a micro computer 99 connected to an analogue-to-digital convertor 98, a temperature setting unit 95, a mode setting unit 96, and a control switch unit 97. Connected to the A-D converter 98 are an inner temperature sensor 91a, an outer temperature sensor 91b, a water temperature sensor 92a, an air temperature sensor 92b, an opening degree sensor 93a, and a solar radiation sensor 94. The inner temperature sensor 91a is arranged inside the cabin 34, for detecting an actual temperature $T_r$ of the cabin 34 to thereby produce an analogue electric signal indicating the actual temperature $T_r$ of the cabin 34. The outer temperature sensor 91b is arranged adjacent to a position of the vehicle suitable for a detection of the atmospheric air temperature $T_{am}$, such as near a front grill of a radiator (not shown) of the engine, to thereby issue an analogue electric signal indicating the atmospheric air temperature $T_{am}$.

The engine cooling water temperature sensor 92a is arranged adjacent to a cooling water inlet of the heater core 21, for detecting the actual temperature $T_w$ of the engine cooling water from the cooling device, and issuing an analogue signal indicating the actual temperature $T_w$ of the engine cooling water. The air temperature sensor 92b is arranged adjacent to the air outlet of the evaporator 12, for detecting the temperature $T_E$ of the air from the evaporator 12 and issuing an analogue signal indicating the detected temperature $T_E$ of the air from the evaporator 12. The opening position senor 93a is connected to a rod 71A which is moved upward or downward by the servomotor 71 for detecting the actual opening position $A_P$ of the switching gate 70 related to the vertical displacement of the rod 71A, so that an analogue signal indicating the actual opening position $A_P$ of the switching gate 70 is obtained. The sun radiation sensor 94 is arranged in the cabin 34 at a position adjacent to a window, for detecting the sun radiation amount $T_S$ and issuing a signal indicating the sun radiation amount $T_S$.

The A-D convertor 98, in response to a command from the microcomputer 99, operates to convert the analogue signals from the sensors 91a to 94 into digital signals, and introduces these digital signals into the microcomputer 99 as indicating the inner air temperature $T_r$, opening position $A_P$, outer air temperature $T_{am}$, engine cooling water temperature $T_w$, air temperature $T_E$, and the sun radiation amount $T_S$.

The temperature setting unit 96 is arranged inside the cabin 34 at a position such that the driver or passenger can manually adjust the desired setting of the temperature $T_{set}$, to thereby issue a signal indicating same. The mode setting unit 96 is constructed by a plurality of switches that are selectively operated to obtain an Automatic Air Conditioning mode, a Heating mode, a Bi-level mode, a Ventilation mode, and a Defrosting mode, respectively.

The control switch unit 97 is constructed by automatic return type first, second, third and fourth switches. The first switch, when operated, generates a first instruction signal for a control of the blower 11, and the second, third and fourth switches, when operated, generate second, third and fourth instruction signals, respectively, for a control of the air flow amount W by the blower 11 to a large flow amount value $H_1$, a medium flow amount value $M_e$, and a small air flow amount value $H_0$, respectively.

Figure 13:
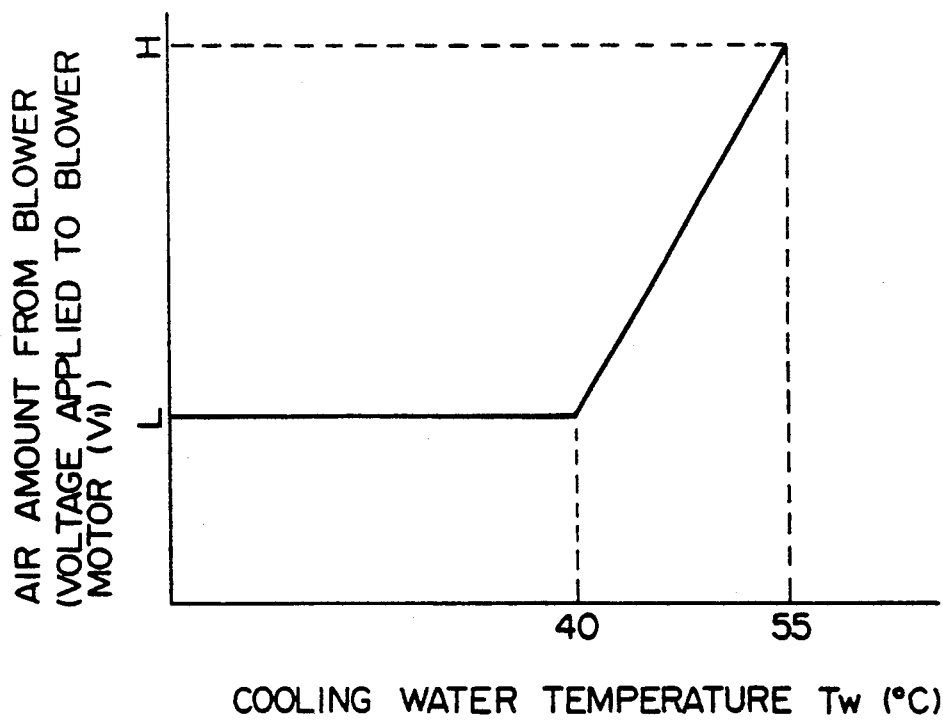
FIG. 13 shows a relationship between the engine cooling water temperature and the amount of air from the blower.
Figure 14:
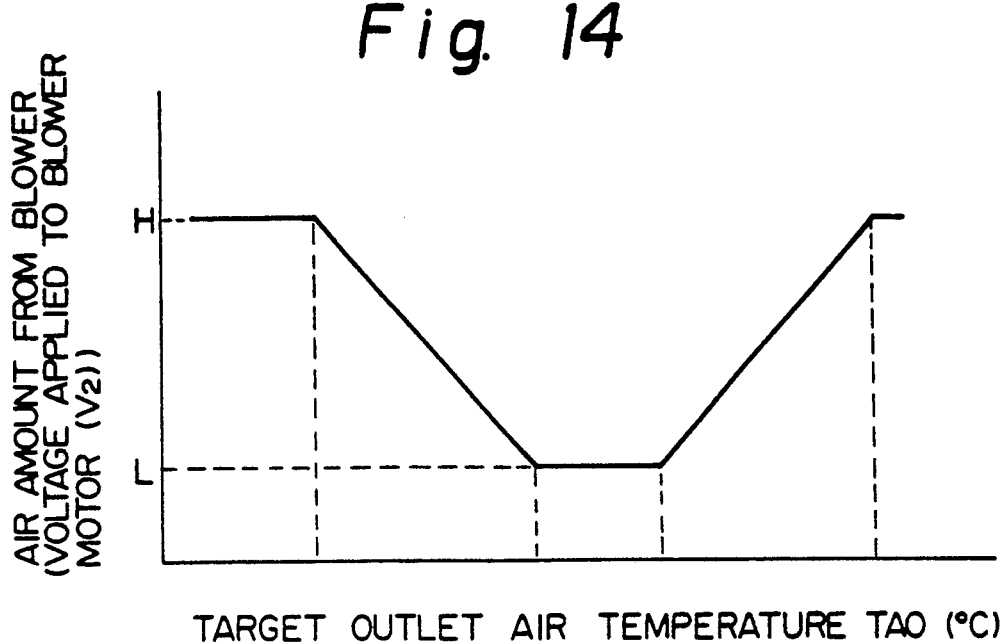
FIG. 14 shows a relationship between the target air temperature and the amount of air from the blower.
Figure 16:
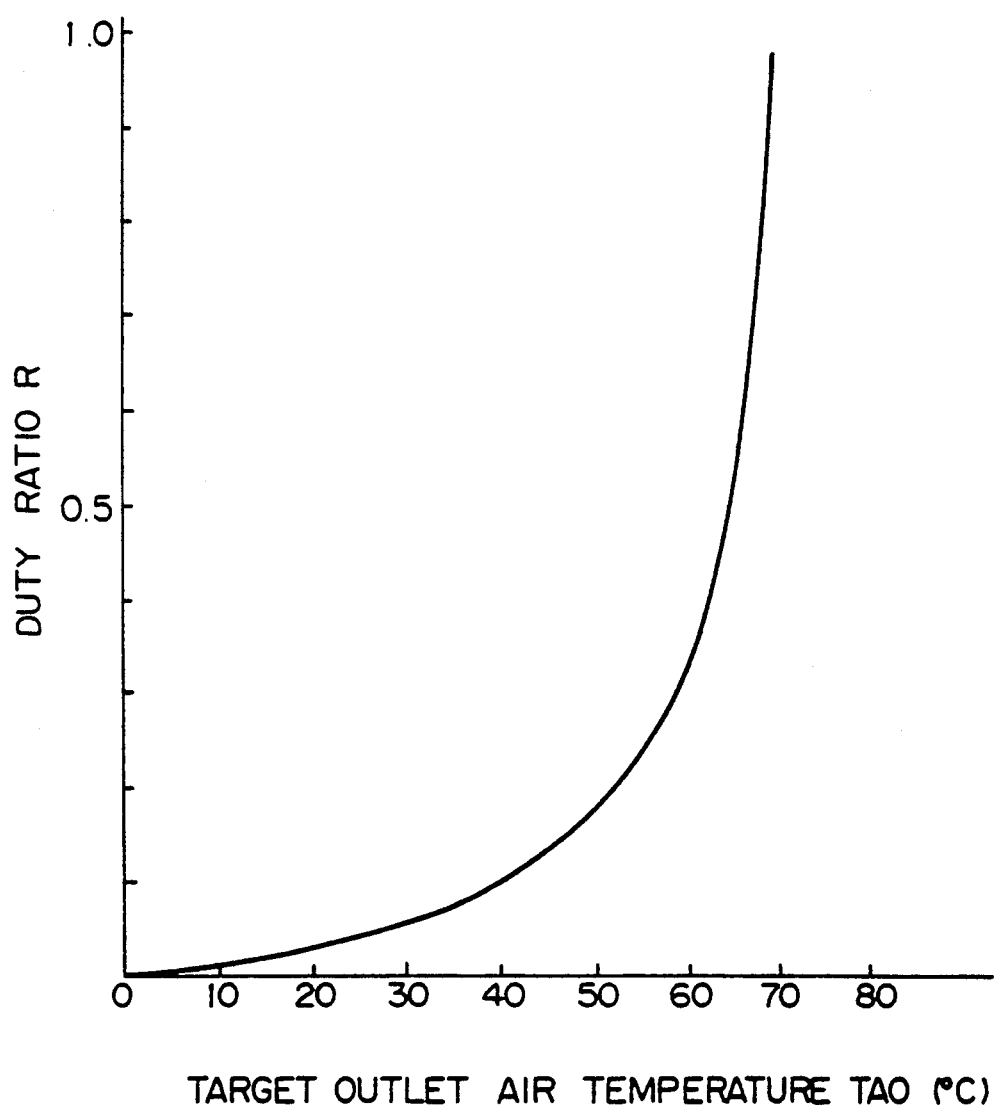
FIG. 16 shows a relationship between the target air temperature and the duty ratio.

The microcomputer 99 is constructed as a single chip large scale integrated circuit (LSI) supplied with electric power having a constant level voltage, by a constant voltage control circuit (not shown). As is well known, the microcomputer 99 includes a central processing unit (CPU) 80, read only memory (ROM) 81, random access memory (RAM) 82, input-output interface (below, I/O) 83, and a clock generating circuit (not shown). The RAM receives, via the I/O, the temperature setting signals from the temperature setting unit 95, and instruction signals from the mode setting unit 96 and the control switch unit 97, and then temporarily stores this data. The data in the RAM 82 is selectively supplied to the CPU 80. Furthermore, in this embodiment, the RAM 82 is supplied with power by the battery B, even when the ignition key switch IG is made OFF, to prevent a loss of the data stored in the RAM 82. The ROM 81 stores predetermined control programs and data maps corresponding to the relationships between the target blown air temperature TAO and duty ratio, as shown in FIG. 16, a relationship between the engine cooling water temperature $T_W$ and the air flow amount from the blower, as shown in FIG. 13, and a relationship between the target blown air temperature and air flow amount from the blower as shown in FIG. 14. The CPU 80 issues, in accordance with programs described later and stored in the ROM 81, a signal to the drive circuit 85, which indicates the voltage to be applied to the blower motor 11a, and a signal to the control circuit 84 for controlling valves 25a and 25b of a valve assembly 25, the construction of which will be fully explained later. The CPU 80 further controls the servo-motors 71 and 73 for operating the switching gates 70 and 72 in accordance with an air blowing mode selected.

Construction of Heater System

Figure 6:
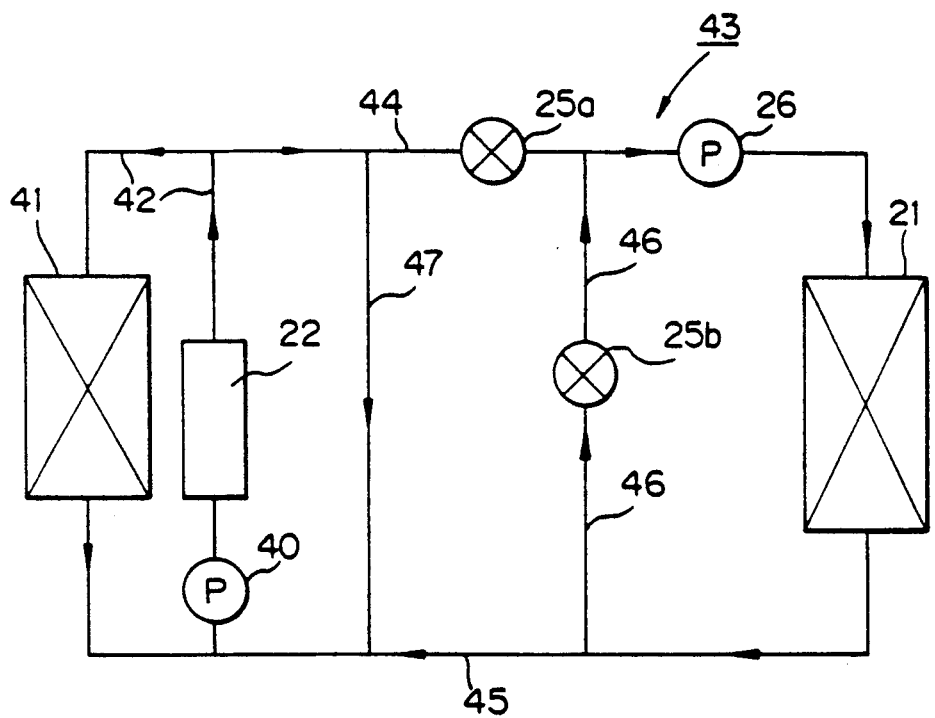
FIG. 6 is a schematic view of an engine cooling water line for the heater core.

As shown by the diagrammatic view in FIG. 6, the engine cooling system is constructed by a recirculation line 42 for the engine cooling water connected between the engine 22, a water pump 40, and a radiator 41. Branched from the re-circulation line is a heater line 43 constructed by an introduction passageway 44 for diverting a certain amount of high temperature engine cooling water from the re-circulation line 42 and introducing same into the heater core 21, and a return passageway 45 for returning a low temperature engine cooling water that has been subjected to a heat exchange operation with the air flow for air conditioning. Arranged in the introduction passageway 44 are a first valve 25a and a pump 26, which is located downstream from the valve 25a for a forcible introduction of the engine cooling water to the heater core 21. A re-circulation passageway 46 is provided, and has a first end connected to the return passageway 45 and a second end connected to the introduction passageway 44 at a location between the first valve 25a and the pump 26. A second valve 25b is arranged in the re-circulation passageway 46. A by-pass passageway 47 is provided, and has a first end connected to the introduction passageway 44 at a location upstream of the first valve 25a and a second end connected to the return passageway 45. The bypass passageway 47 is provided for suppressing water hammer which otherwise may occur when the first valve 25a or a second valve 25b is opened or closed, and prevents pulsation of the pressure of the cooling water applied to the heater core 21.

Construction of Valves

Figure 7:
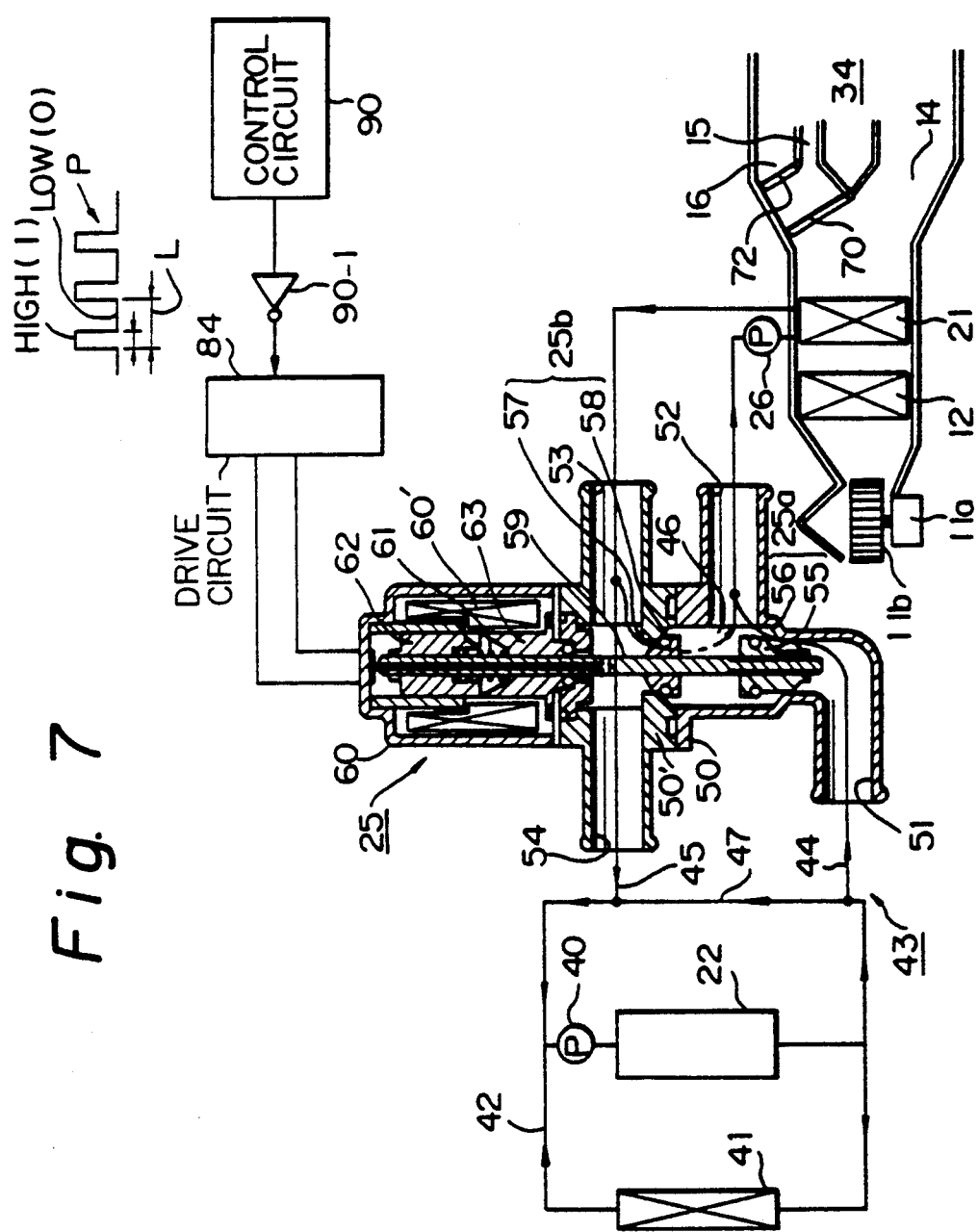
FIG. 7 shows an air conditioning apparatus according to the present invention, detailing an on-off operated valve device for controlling a desired temperature of the heater core.

As shown in FIG. 7, in addition to the first and the second valves 25a and 25b, the valve assembly 25 is provided with a lower housing 50, an upper housing 50', and a solenoid 60. According to the embodiment, the solenoid 60 operates the first and second valves 25a and 25b in unison, such that the first 25a is in the open position while the second valve 25b is in the closed position when the solenoid 60 is de-energized, and the first valve 25a is in the closed position while the second valve 25b is in the open position when the solenoid 60 is energized. In more detail, the lower housing 50 forms a first inlet 51 for an introduction of high temperature engine cooling water from the cooling water re-circulation passageway 42 of the engine, and a first outlet 52 for emitting the high temperature engine cooling water to the heater core 21. The upper housing 50 forms a second inlet 53 for receiving the low temperature cooling water after a heat exchange at the heater core 21, and a second outlet 54 for returning the low temperature engine cooling water into the recirculating line 42 of the engine 22. To obtain the above-mentioned flow of the engine cooling water in the heater core line, the introduction passageway 44 from the engine re-circulation line 42 is connected to the first inlet 51 and to the first outlet 52 via the first valve 25a. The second inlet 51 and the second outlet 54 from the heater core 21 are always connected to the return passageway 45 to the engine re-circulation line 42.

As shown in FIG. 7, the first valve 25a is constructed by a first valve member 55 and a first valve seat 56 formed inside the lower housing 50. The first valve 25a communicates the first inlet 51 with the first outlet 52 when the first valve member 55 is displaced from the first valve seat 56. The second valve 25b is constructed by a second valve member 57 and a second valve seat 58 formed inside the upper housing 50'. A re-circulation of the low temperature cooling water, emitted from the second inlet 53 to the second outlet 54, occurs toward the flow of the high temperature cooling water from the first inlet 51 to the first outlet 52, when the second valve member 57 is displaced from the second valve seat 58. The re-circulation passageway 46 is formed inside the lower housing 50 such that the passageway 46 always communicates the second outlet 54.

The solenoid 60 is constructed by a coil 60, a fixed sleeve 63 arranged inside the coil 60', a rod shape plunger 59 slidably inserted to the sleeve 63, a moving member 62 fixedly connected to the top end of the plunger 59, and a coil spring 61 urging the moving member 62 upward in FIG. 7 so that the member 62 is spaced from the stator 63. The plunger 59 passes through the first valve member 57, and the member 57 is fixedly connected to the plunger 59. Furthermore, the plunger 59 has a bottom end to which the first valve member 55 is fixed. The solenoid 60 as shown in FIG. 7 is connected to the drive circuit 84 operated by the microcomputer control circuit 90 via an inverter 90-1. Therefore, when the control circuit 90 issues a High (1) signal, the solenoid 60 is de-energized, and when the control circuit issues a Low (0) signal, the solenoid 60 is energized. When the solenoid 60 is de-energized by the high signal (1) from the control circuit 90, the force of the spring 61 causes the plunger 59 to be moved upward in FIG. 7, and therefore, on one hand the first valve member 55 is lifted from the first valve seat 56, to permit the first valve 25a to be opened, and on the other hand, the second valve member 57 is seated on the second valve seat 58 to permit the second valve 25b to be closed. When the solenoid 60 is energized by the Low signal (0) from the control circuit 90, an electromagnetic force is generated which causes the plunger 59 to be moved downward in FIG. 7 against the force of the spring 61, and therefore, on one hand the first valve member 55 is seated on the first valve seat 56 to permit the first valve 25a to be closed, and on the other hand, the second valve member 57 is displaced from the second valve seat 58 to permit the second valve 25b to be opened.

Operation

In FIG. 5, the blower motor 11a controlled by the drive circuit 85 causes the fan 11b to rotate and generate a flow of air to be introduced into the evaporator 12, wherein the air flow from the blower 11 is subjected to a heat exchange with the refrigerant passing through the evaporator 12, to thus cool the air flow. The air flow is then introduced into the heater core 21, wherein the air flow from the evaporator 12 is subjected to a heat exchange with the engine cooling water, to heat the air flow to a desired temperature. The air flow is finally blown into the cabin 34 via the ventilation outlet 15, the heater outlet 14, or the defroster outlet 16.

Figure 19:
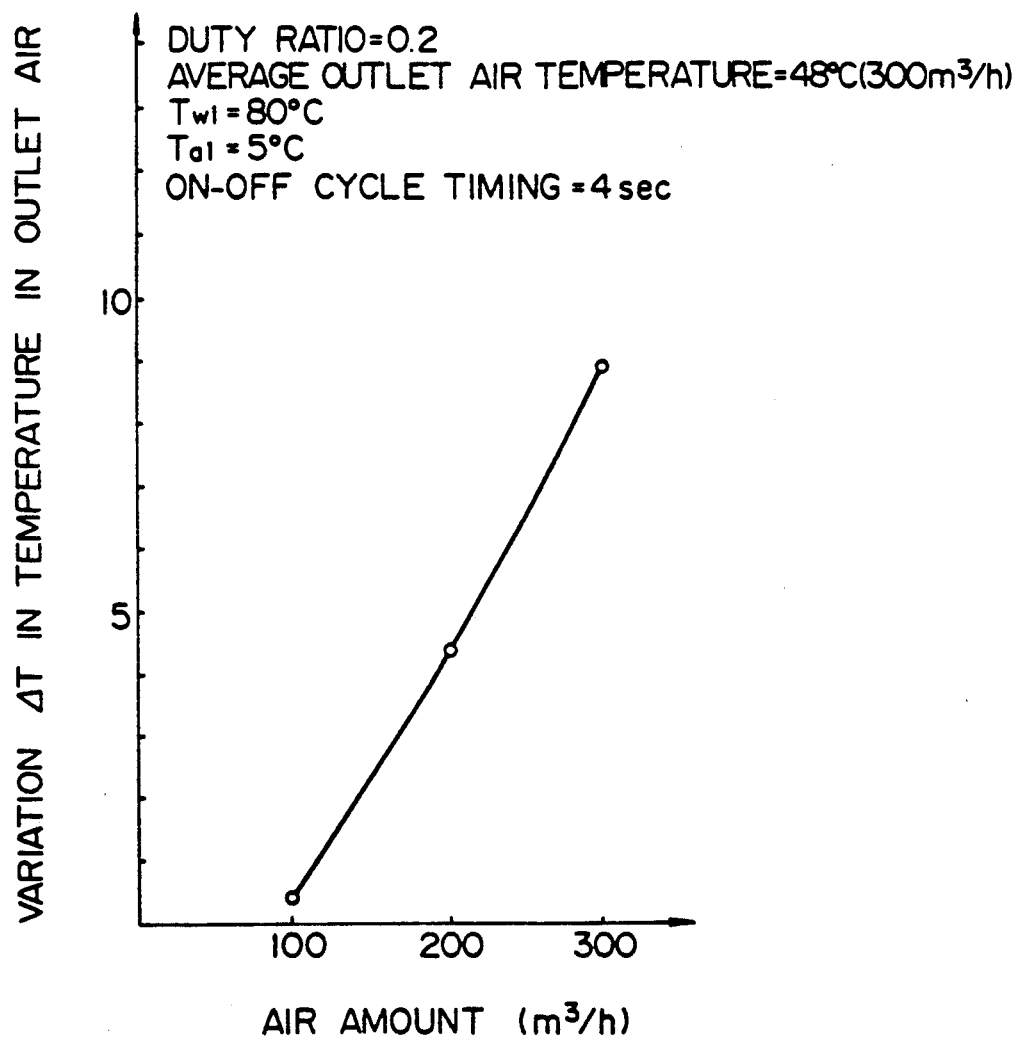
FIG. 19 shows relationship between the air amount and variations in the temperature of the outlet air.

The amount of air flow blown by the fan 11b is determined by the value of the voltage of the electric signal applied to the blower motor 11a. Namely, the higher the value applied, the larger the amount of air flow. The increase in the amount of air causes the amount at the evaporator 12 and/or the heat exchange at the heater core 21 to be increased, and as a result, an increase in the air flow amount causes an increase in the thermal load at the heater core. As a result, an increase in the air flow amount causes an increase in the variation $\Delta T$ in the temperature of air as blown into the cabin 34 when the on-off control of the heater core 21 is carried out, as shown in FIG. 19.

The selection of an outlet from among the ventilation outlet 15, the heat outlet 16 and the defroster outlet 14 is made by adjusting the degree of opening of the switching gates 70 and 72.

Figure 8A:
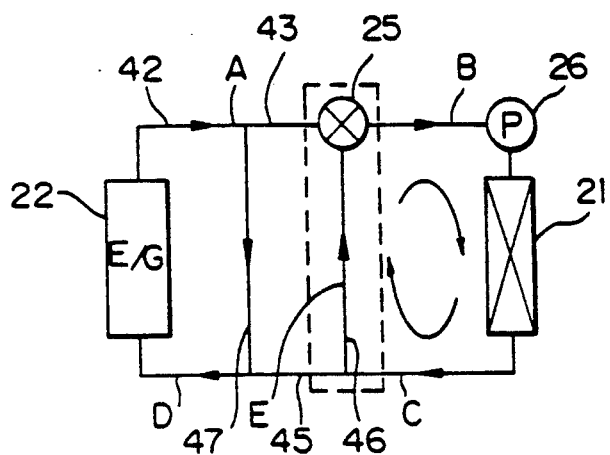
FIG. 8-(a) is a schematic view of the flows of the hot water and cool water in the system according to the present invention.
Figure 8B:
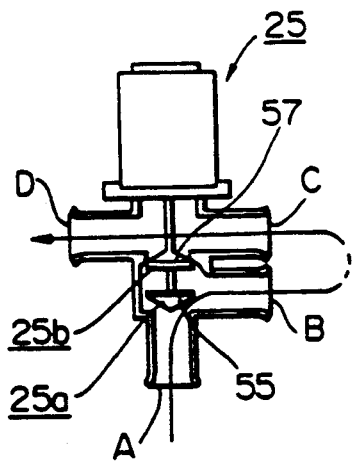
Figure 8C:
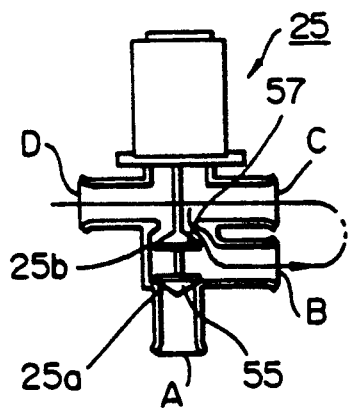

FIGS. 8-(a), (b) and (c) illustrate the operation of the construction shown in FIGS. 5 and 6. As shown in FIG. 8-(a), the heater core 21 is arranged in the water passageway 43 branched from the engine water line 42 from the internal combustion engine 22. When the valve 25 is de-energized (high temperature mode), i.e., when the on-off signal P for operating the solenoid 60 is high (1), the first valve 25a is open and the second valve 25b is closed, as shown in FIG. 8-(b). As a result, the high temperature engine cooling water from the engine water line 42 is diverted into the heater passageway 43, as shown by arrows A and B, by the water pump 26, and the pump 26 forcibly introduces the engine cooling water into the heater core 21 and then returns it to the engine water line 42, as shown by arrows C and D. As a result of such a re-circulation of the engine cooling water in the re-circulation line 43 while the valve 25 is de-energized, hot water flows through the heater core 21, to raise the temperature thereof, and the air from the blower 11 is then brought into contact therewith, to thus increase the temperature of the air.

When the valve 25 is energized (low temperature mode), i.e., when the on-off signal P for operating the solenoid 60 is low (0), the first valve 25 is moved downward to be closed, while the second valve 25b is opened as shown by FIG. 7-(c). As a result, the communication between the arrows A and B is disconnected, and thus a re-circulation of the water, as shown by the arrows B, C and E, is created by the pump 26. In this case, the hot water from the engine 22 is not introduced, and thus the temperature of the heater core 21 is lowered.

According to the present invention, an on-off signal P having an adjusted duty ratio is issued by the control circuit 90, via the drive circuit 84, to the solenoid 60 of the valve device 25, to obtain a desired temperature of the heater core 21. The duty ratio as described hereinbelow in this specification, is one cycle of the on-off signal from the drive circuit 84, a ratio of a duration of a time L in one cycle. Furthermore, according to the present invention, a value of the cycle of the control signal is controlled in accordance with the duty ratio, a voltage is applied to the blower motor 11a, and an outlet mode is selected, whereby changes in the temperature are controlled within a permissible range, and thus the durability of the valve device 25 is increased.

Figure 9:
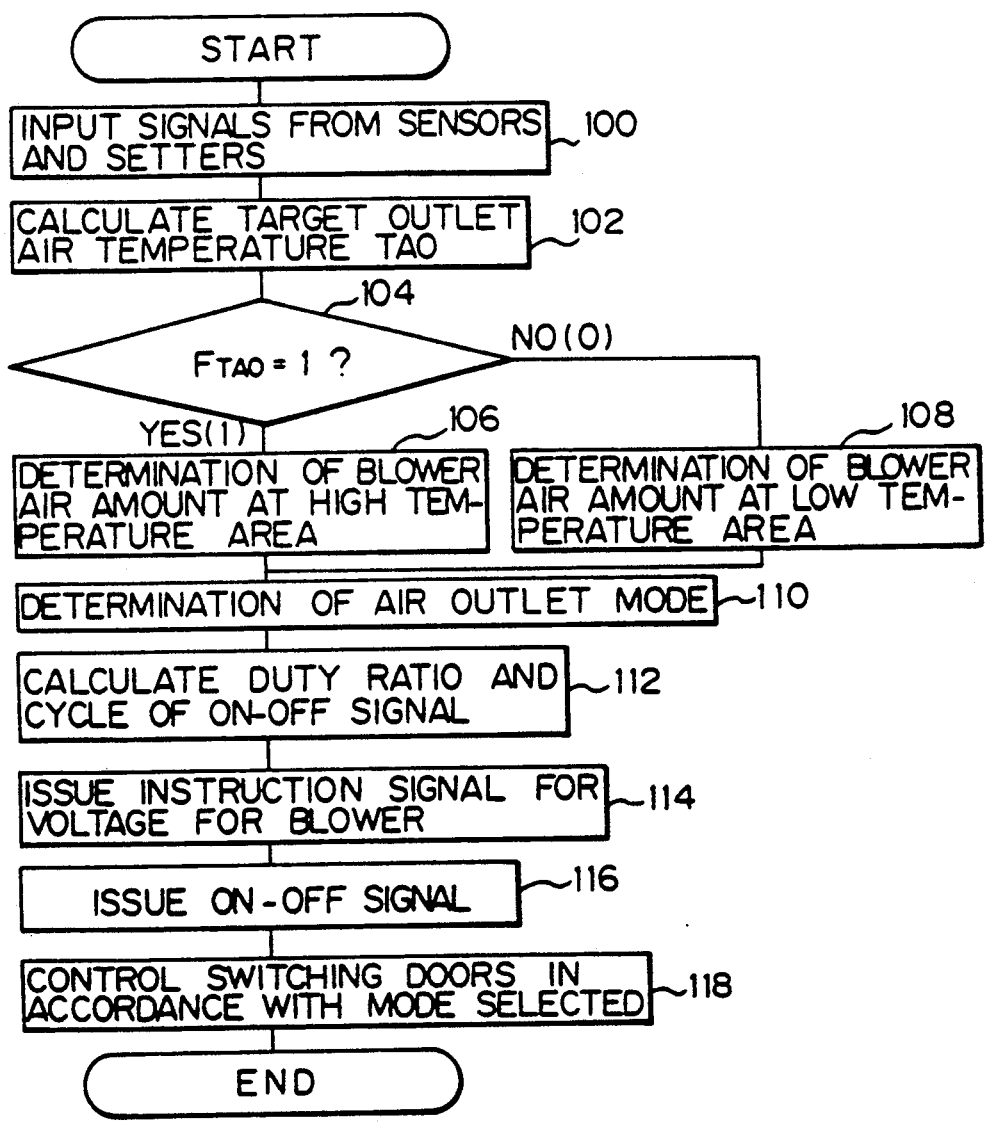
FIGS. 9, 10 and 11 are flow charts illustrating the operation of the apparatus of the present invention.
Figure 10:
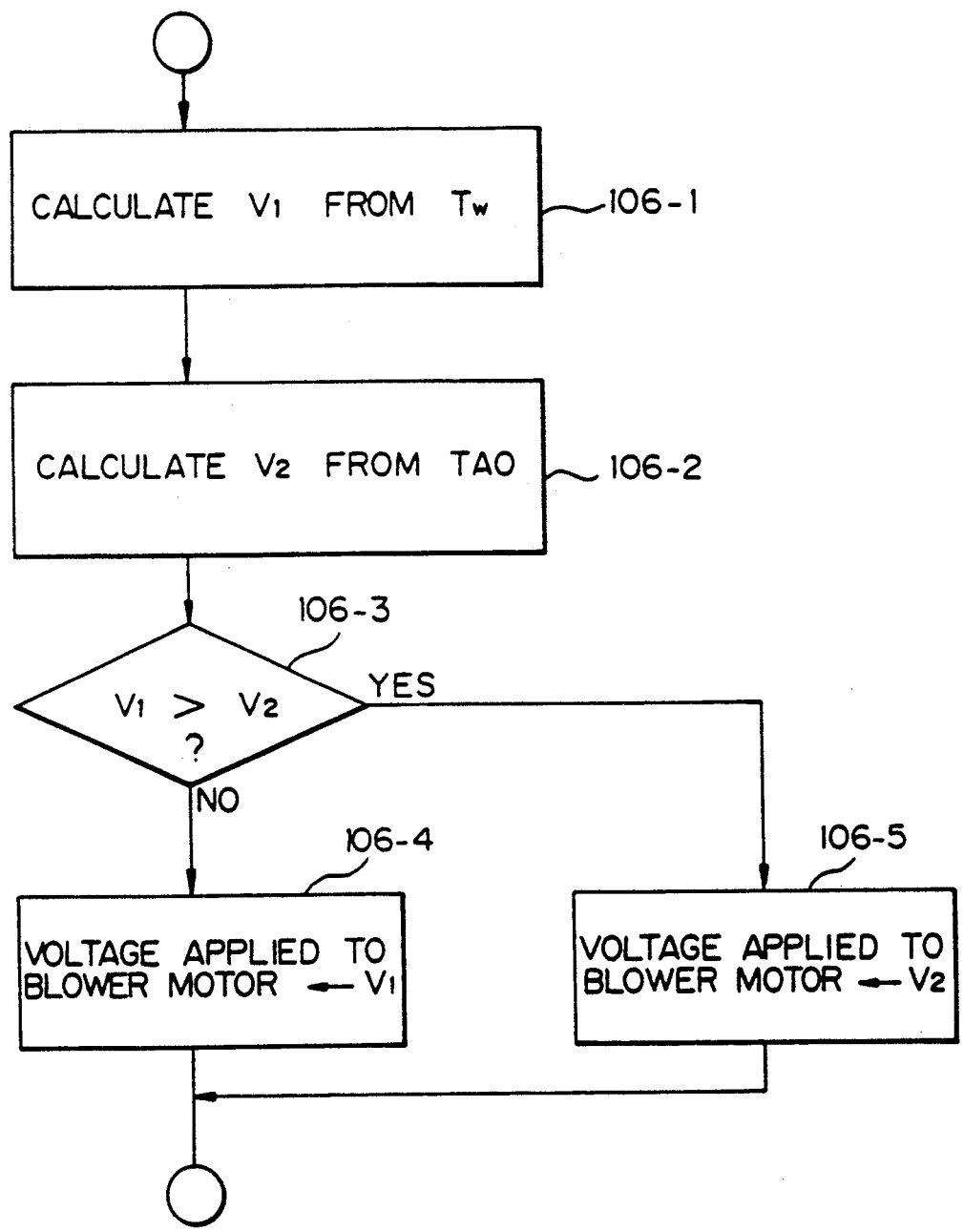

An air conditioning control by the CPU will be explained with reference to the flow charts of FIGS. 9 and 10. The routine in FIG. 9 is a time interruption routine executed at predetermined intervals. At step 100, output values from the sensors, such as the water temperature sensor 92a, the inner air temperature sensor 91a, the outer air temperature sensor 91b, and the sun radiation sensor 94 ($T_W$, $T_r$, $T_{am}$, and $T_S$) are input, and further, the output value ($T_{set}$) of the temperature set unit 95 and the state of the control valve from the control switch unit 97 are input.

At step 102, a target value TAO of the outlet temperature is calculated by the following equation, $$TAO = K_S \times T_{set} - K_r \times T_r - K_{am} \times T_{am} - K_S \times T_S + C,$$

where $K_S$ is a temperature set gain, $K_r$ is an inner temperature gain, $K_{am}$ is an outer temperature gain, $K_S$ is a sun radiation gain, and C is a correction constant.

Figure 12:
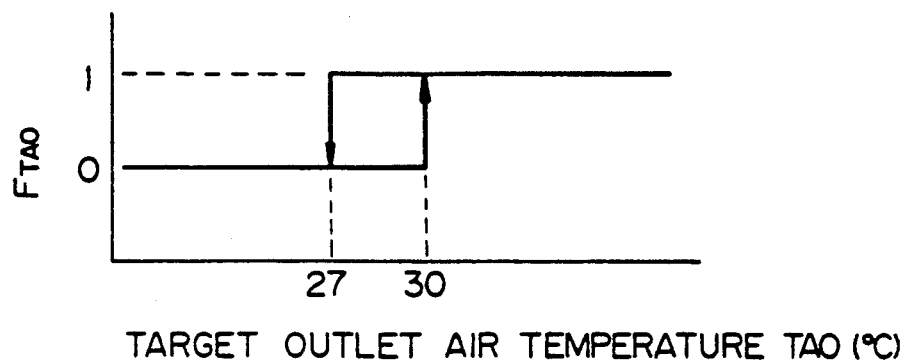
FIG. 12 shows a hysteresis characteristic of the target air temperature.

At step 104, it is determined if a target temperature flag $F_{TAO}$ is 1. As shown in FIG. 12, this flag is set (1) when the target outlet air temperature exceeds 30° C. when the target temperature TAO is rising. Contrary to this, the flag is reset (0) when the target outlet air temperature drops below 27° C. when the target temperature TAO is falling. When it is determined that the $F_{TAO} = 1$ at step 104, the routine goes to step 106, and a determination of an air amount blown from the blower 11b while at a high air temperature is carried out. The details of this determination at step 106 are shown in FIG. 10. At step 106-1, a value of the voltage applied to the blower motor 11a, $V_1$ is calculated from the engine cooling water temperature $T_W$ detected by the sensor 92a, based on a relationship as shown in FIG. 13. As a conventional technique, a map corresponding to the relationship in FIG. 13 is stored in the memory 81, and a map interpolation calculation is carried out to obtain a value of the blower air amount, $V_1$ corresponding to the detected value of the engine cooling water temperature $T_W$. At step 106-2 in FIG. 10, a value of the voltage applied to the blower motor, $V_2$ is calculated from the target air blowing out temperature TAO, based on a relationship as shown in FIG. 14. A map corresponding to the relationship in FIG. 14 is also stored in the memory 81, and a map interpolation calculation is carried out to obtain a value of the blower air amount $V_2$, corresponding to the target air blowing out temperature TAO. At step 106-3, it is determined if the value of $V_1$ is larger than the value of $V_2$. When it is not determined that $V_1 > V_2$, the routine goes to step 106-4 and the value of $V_1$ based on the engine cooling water temperature $T_W$ is used as the blower air amount. When it is determined that $V_1 > V_2$, the routine goes to step 106-4 and the value of $V_2$ based on the target outlet air temperature TAO is used as the blower air amount. As a result, between the $V_1$ and $V_2$, that providing the lower value is selected as the voltage applied to the blower motor 11a for determining the amount of air blown from the fan 11 under a high temperature condition.

Returning to FIG. 9, when it is determined that the $F_{TAO} = 0$ at step 104, the routine goes to step 108 and a determination of the air amount blown from the fan 11b in the low temperature state is carried out. At this step, as in step 106-1 of FIG. 10, a value of the voltage applied to the blower motor is calculated from the target air blowing out temperature TAO, based on a relationship as shown in FIG. 14. Then, the value of the voltage as applied to the fan motor 11a is controlled to this value of the voltage calculated from the map. In other words, unlike during the high temperature state, where one map is selected from two maps, under the low temperature state, only a single map in FIG. 14 is used for a determination of the air amount blown from the blower 11b.

Figure 15:
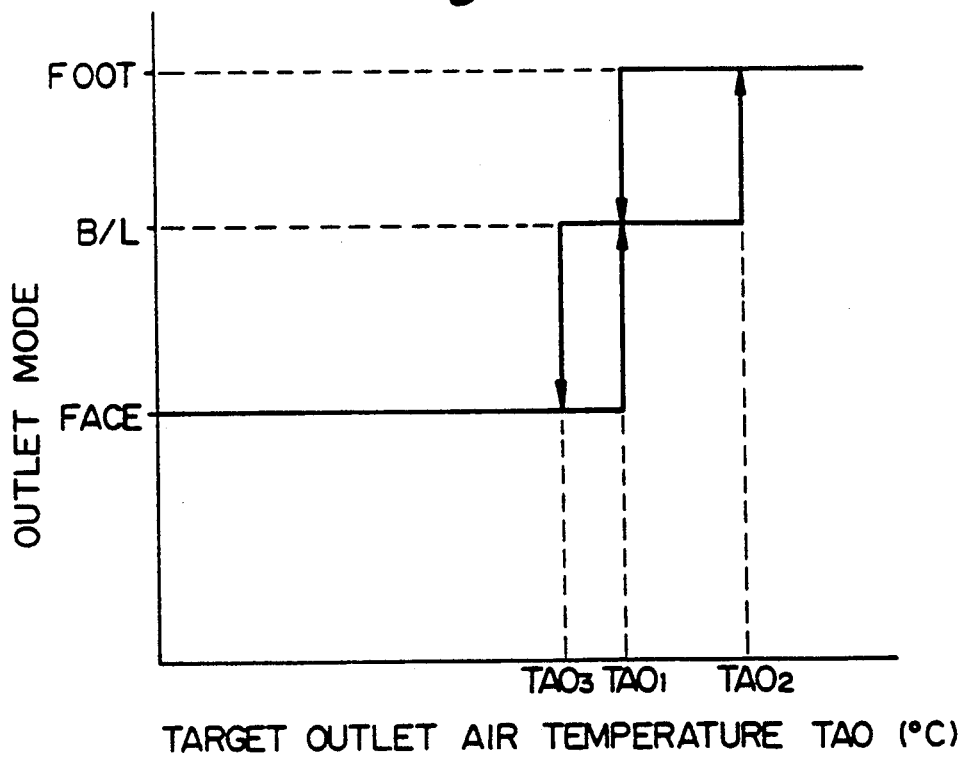
FIG. 15 shows a relationship between the target air temperature and the air outer modes.

After the determination of the blown air amount, the routine goes to step 110, and an air blown out mode M is determined from the target air blowing out temperature TAO, based on a relationship as shown in FIG. 15. In FIG. 15, three kind of modes are obtained, i.e., a FACE mode (ventilation mode), a B-L mode (bi-level mode), and a FOOT mode (heat mode). As shown in FIG. 15, when the target temperature rises and exceeds a predetermined value $TAO_1$, the mode is changed from the FACE mode to the B-L mode; when the target temperature rises and exceeds a predetermined value $TAO_2$, the mode is changed from the B-L mode to the FOOT mode; when the target temperature falls below the predetermined value $TAO_1$, the mode is changed from the FOOT mode to the B-L mode; and when the target temperature falls below the predetermined value $TAO_3$, the mode is changed from the B-L mode to the FACE mode.

Figure 11:
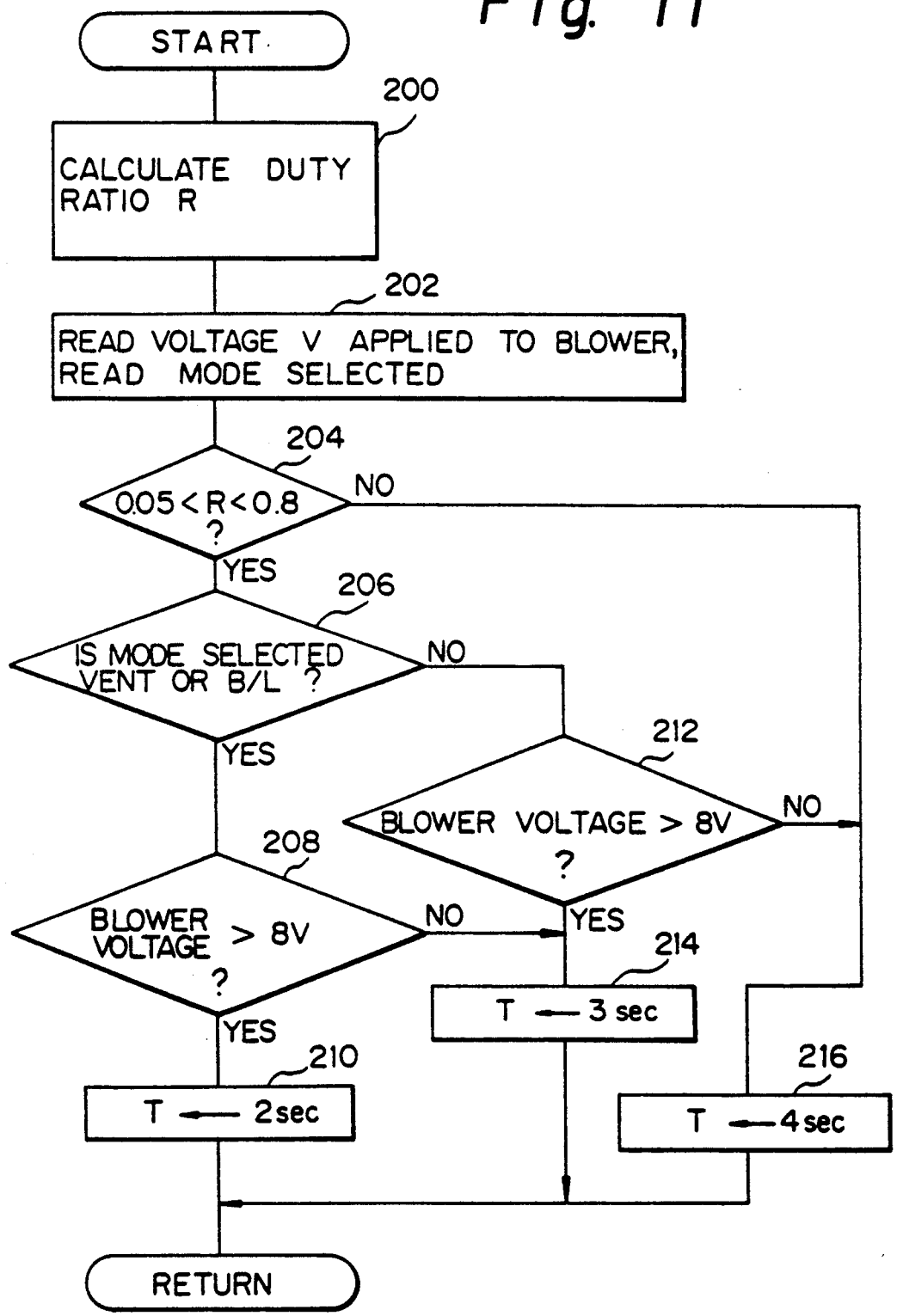

At the following step 112, a value of the duty ratio of an on-off signal for operating the valve device 25, and a cycle of the on-off signal, are calculated. The details of step 112 are shown in FIG. 11. At step 200, a value of the duty ratio R is calculated from the target air outlet temperature TAO, based on a predetermined relationship as shown by a curve in FIG. 16. As already explained, in the on-off signal for operating the valve 25, the duty ratio is a ratio of the duration of the time 1 at the high state (1) to the duration of the time L in one cycle of the signal. The high state (1) of the on-off signal corresponds to a condition of the valve 25 wherein the first valve 25a is open while the second valve 25b is closed, which allows the engine cooling water from the engine cooling water line 42 to be introduced into the heater water line 43 as shown by FIG. 7-(b). Therefore, the larger the duty ratio, the higher the amount of the hot water diverted from the engine, to thereby increase the temperature of the heater core 21. A map interpolation is carried out to obtain a value of the duty ratio R corresponding to the output target air temperature, TAO.

At step 202, the voltage applied to the blower motor 11a and calculated at step 106 or 108, and the mode to be selected, and determined at step 110 are read out. At following step 204, it is determined if the value of the duty ratio R is larger than 0.05 but smaller than 0.8. When it is determined that $R \leq 0.05$ or $R \geq 0.80$, the routine goes to step 216, and the value of one cycle T of the ON-OFF signal is set to 4 seconds.

When the value of the duty ratio $R \leq 0.05$, an average value of the ratio of the degree of opening to the full degree of opening of the first valve 25a is smaller than 0.05, and an average value of the ratio of the degree of opening to the full degree of opening of the second valve 25b is larger than 0.95. This means that almost all of the water introduced into the heater core 21 is low temperature water recirculated from the heater core 1. Namely, since the amount of high temperature engine cooling water from the engine 22 is very small, only a small change can be generated in the temperature of the water passing through the heater core 21, by the on-off operation of the valve device 25, and thus it is possible to increase the length of the cycle of the on-off signal; this is why a value as high as 4 seconds is employed as the value of the cycle T. The large value of the cycle T of the on-off signal is advantageous in view of the durability of the valve device 25, since the frequency of the on-off operations is thus reduced.

When the value of the duty ratio $R \geq 0.8$, an average value of the ratio of the degree of opening to the full degree of opening of the first valve 25a is larger than 0.8, and an average value of the ratio of the degree of opening to the full degree of opening of the second valve 25b is smaller than 0.2. This means that almost all of the water introduced into the heater core 21 is high temperature water from the engine 22. Namely, since the amount of low temperature water recirculated from the heater core 21 is very small, only a small change can be generated in the temperature of the water passing through the heater core 21, by the on-off operation of the valve device 25. Therefore, similar to the case where the duty ratio $R \leq 0.05$, it is possible to increase the period of the cycle of the on-off signal, and thus a value of the cycle T of the on-off signal of as large as 4 seconds is selected, to thereby increase the service life of the valve device 25.

Figure 17:
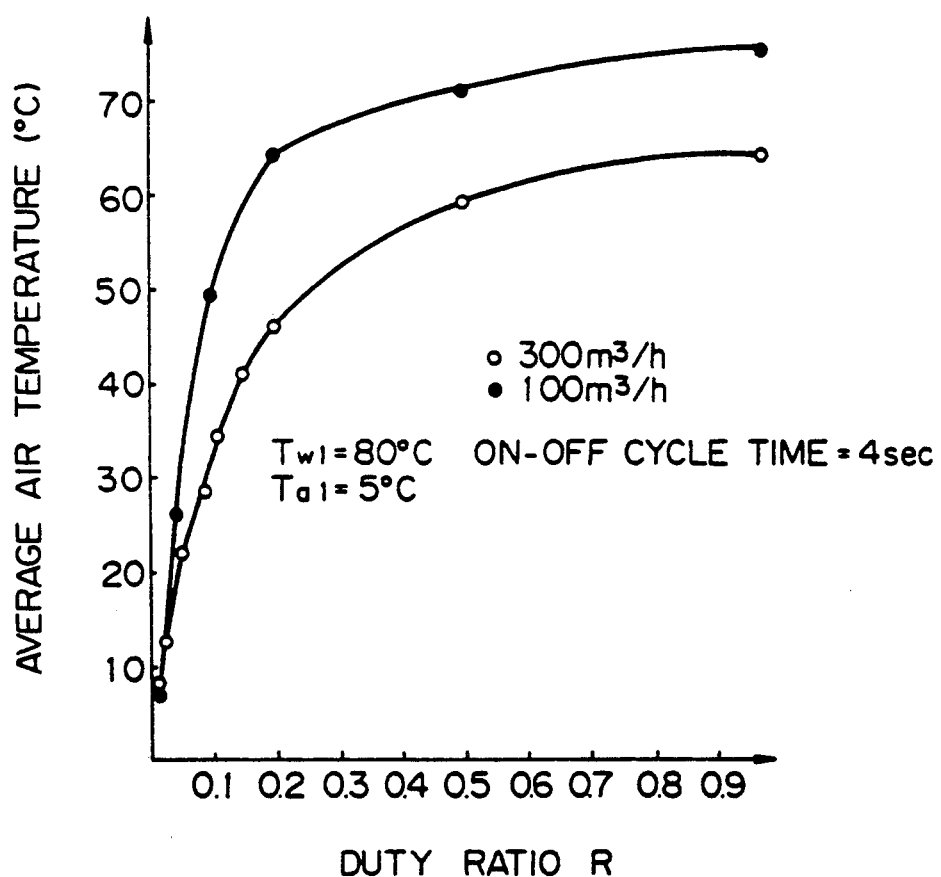
FIG. 17 shows relationships between a duty ratio and an average outer air temperature.

FIG. 17 shows relationships between the value of the duty ratio R and the temperature of the air blown at the heater core 21, while the amount of the air is changed between 100 m$^3$ per hour and 300 m$^3$ per hour. In this case, the temperature $T_{w1}$ of the high temperature engine cooling water introduced into the heater water line 43 from the engine water line 42 is 80° C., and the temperature $T_a$ of the air introduced into the heater core 21 is 5° C. As explained above, when the value of the duty ratio $R \leq 0.05$, the temperature of the blown air is lower than 15° C., regardless of the amount of air blown. Conversely, when the duty ratio $R \geq 0.8$, the outlet temperature is higher than about 63° C. when the air flow amount is 300 m³/h, and the outlet temperature is higher than about 74° C. when the air flow amount is 100 m³/h. This means that there is a large change in the temperature of air emitted in accordance with the air flow amount.

Figure 18A:
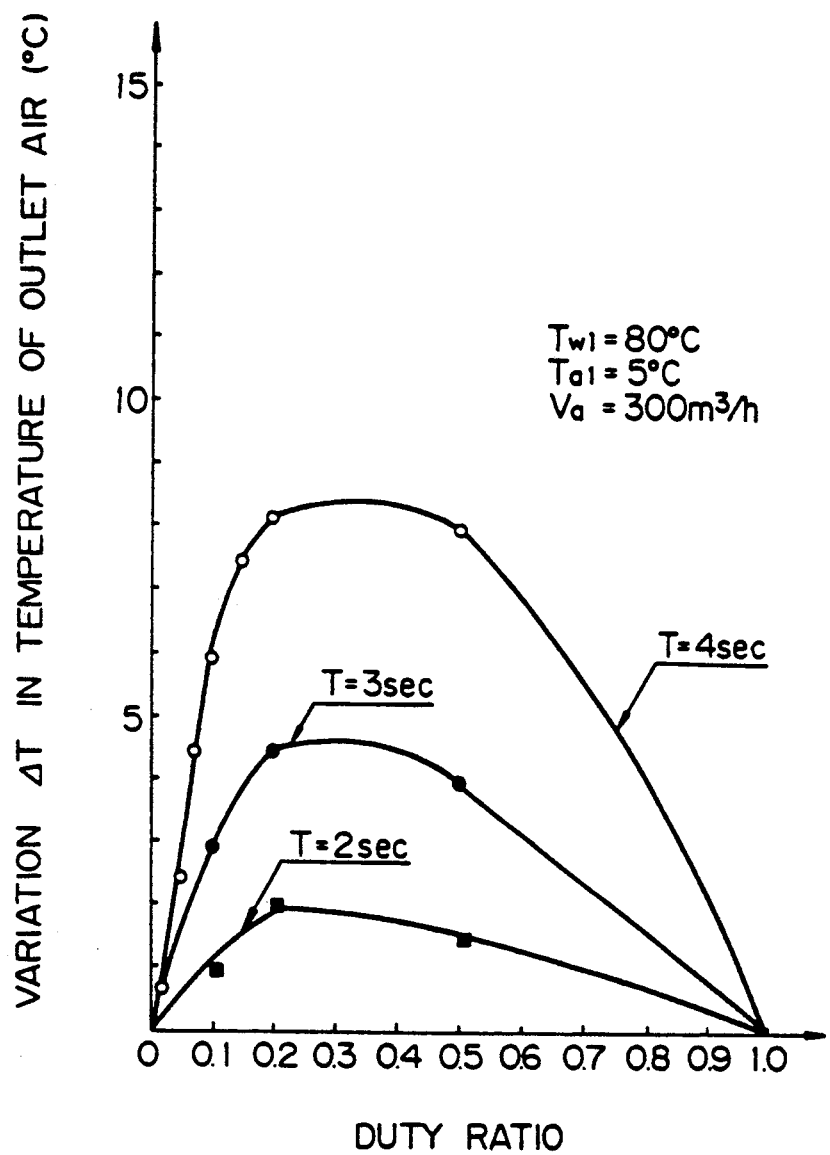
FIG. 18 shows relationships between the duty ratio and variations in the blown air temperature.
Figure 18B:
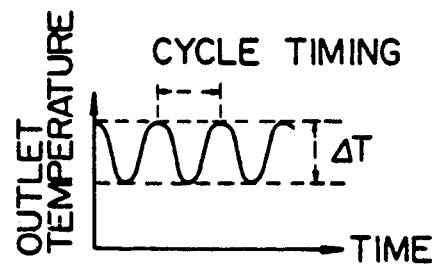

FIG. 18 shows relationships between the value of the duty ratio R and the variation $\Delta T$ in the temperature of the air flow emitted, with respect to the change in the values of the cycle time T of the on-off operation of the valve 25. In this case, the temperature $T_{w1}$ of the engine cooling water from the engine is 80° C., and the temperature $T_{a1}$ of the air introduced into the heater core 21 is 5° C. As will be seen from FIG. 18, when the value of the duty ratio $R \leq 0.05$, or when the value of the duty ratio $R \geq 0.8$, there is no large change in the value variation $\Delta T$ of the temperature of the air emitted from the heater core 21.

FIG. 19 shows a relationship between the amount of air flow and a variation $\Delta T$ in the temperature of air emitted when the cycle time T of the on-off signal is fixed at 4 seconds and the value of the duty ratio R is fixed at 0.2. The temperature $T_{w1}$ of the engine cooing water from the engine 22 was 80° C. and the temperature $T_{a1}$ of the air introduced into the heater core 21 from the evaporator 12 was 5° C. As will be seen from FIG. 19, when the amount of the air flow is small, the variation $\Delta T$ in the temperature generated by the on-off control of the valve device 25 is also small.

Furthermore, when the duty ratio R is between 0.05 to 0.8, as will be understood from the result shown in FIG. 18, a longer value of one cycle T causes an increase in the variation $\Delta T$ in the temperature of the air emitted, and therefore, in this case, a short cycle T of the on-off signal must be provided.

Returning to FIG. 11, when it is determined that 0.05 < R < 0.8 at step 204, the routine goes to step 206 and it is determined if the ventilation mode (or FACE mode) or B-L (bi-level) mode has been selected, where the blown air flow is directed toward the face of the passanger. When it is determined that the ventilation mode or B-L mode is selected, the routine following step 208 is carried out. Under this mode, tests by the inventors found that a passenger does not usually feel uncomfortable if the variation of the temperature $\Delta T$ is controlled to below a value of 3° C. Therefore, at step 208, it is determined if the value of the electric voltage V applied to the blower motor 11a is higher than a predetermined value of 8 volts, i.e., the amount of air emitted is larger than a predetermined value. When it is determined that the value of the electric voltage V applied to the blower motor 11a is higher than 8 volts, i.e., the amount of air emitted is larger than the predetermined value, the routine goes to step 210 and the value of one cycle of the on-off signal for operating the valve 25 is set at 2 seconds. FIG. 18 shows that the value of 2 seconds of one cycle T of the on-off signal for operating the blower motor 11a can maintain the variation $\Delta T$ in the temperature of the air flow emitted at lower than 3° C. As explained above, the upper limit of the value of the variation $\Delta T$ of the temperature, which does not make the passenger feel uncomfortable, is varied in accordance with the mode selected. Therefore, in accordance with the increase in the amount of air emitted, the value of the cycle T of the on-off signal for operating the valve 25 is lowered, to thereby obtain a value of the variation $\Delta T$ that is smaller than the upper limit value above which the passenger begins to feel uncomfortable.

Returning to FIG. 11, when it is determined that the value of the electric voltage V applied to the blower motor 11a is smaller than 8 volts, i.e., the amount of air emitted is smaller than the predetermined value, the routine goes to step 214 and the value of one cycle T of the on-off signal for operating the valve 25 is set at 3 seconds. As shown in FIG. 19, when the air flow amount is small, the variation $\Delta T$ in the temperature of the air flow emitted is also small. Therefore, a longer value of the cycle T of the on-off signal is sufficient for maintaining the variation $\Delta T$ of the temperature of the air flow emitted at a value lower than 3° C.

When it is determined at step 206 that the mode selected is not the ventilation mode or bi-level mode, i.e., the mode selected is the heat mode wherein the air emitted is not directed toward the face of the passenger, the routine following step 212 is executed. It should be noted that, under the HEAT (or leg) mode, a temperature variation smaller than 6° C. usually does not make a passenger feel uncomfortable. At step 212, it is determined if the voltage applied to the blower motor 11a is larger than 8 volts. When it is determined that the electric voltage level applied to the blower motor 11a is larger than 8 volts, i.e., a large amount of air is emitted, the routine goes to step 214 and the period T of the on-off signal of the valve 25 is set at 3 seconds. As shown in FIG. 19, a large amount of air flow emitted may cause the temperature variation $\Delta T$ obtained by the on-off control of the valve 25 to become large, and therefore, a short period T of the on-off signal as small as 3 seconds is selected, to thereby obtain a variation in the temperature in the air flow smaller than 6° C. Conversely, when it is determined that the electric voltage level applied to the blower motor 11a is not larger than 8 volts, i.e., a small amount of air is emitted, the routine goes to step 216 and the period T of the on-off signal of the valve 25 is set at 4 seconds. When the amount of air flow is small, the variation in the temperature of the air emitted becomes small, and a longer period T of the on-off signal as large as 4 seconds is sufficient for obtaining a variation in the temperature of the air flow smaller than 6° C.

As described above, a longer value of the period T of the on-off signal P is selected in such a manner that the obtained value of the variation $\Delta T$ in the temperature does not make a passenger feel uncomfortable, and as a result, a desired air conditioning operation and an increased durability of the valve device, which are contradictory requirements are obtained.

Returning to FIG. 9, after the duty ratio R and the period T are thus determined at step 112, the routine goes to step 114 and an output instruction signal corresponding to the voltage V to be applied to the blower motor 11a is issued to the drive circuit 85. As a result, the blower motor rotates at a speed at which the desired amount of air flow is obtained.

At the following step 116, an instruction is issued to the drive circuit 84 to commence the output of the on-off signal to the drive circuit 84, and upon receiving the signal to commence this output, the CPU commences the routine for generating the on-off signal. This routine for the generation of the on-off signal is executed by a timer interruption routine executed at predetermined short intervals. Upon the execution of this on-off signal interruption routine, the CPU 80 issues a high level (1) signal to the drive circuit 84, for a time equal to the duty ratio R multiplied by the cycle T, the signal remaining at a high level (1) for a time equal to $(1-R) \times T$. As a result of an execution of this routine, the on-off signal is first amplified by the drive circuit 84 and then input to the solenoid 60 of the valve device 25, whereby an on-off operation of the valve device at a cycle T is obtained with the duty ratio R.

Finally, at step 118 in FIG. 9, signals are issued to the servomotors 71 and 72 for controlling the gates 70 and 72, respectively, in accordance with the mode M determined at step 110, and as a result, a desired control of the degree of opening of the gates 70 and 72 in accordance with the selected mode M is obtained.

In the above embodiment, a value of one cycle of the on-off signal P is determined by the duty ratio R, the blower voltage V applied in accordance with the air flow amount required, and the mode selected, but the cycle can be determined by only one or two of those parameters, or by another parameter such as a target blown air temperature.

Figure 20:
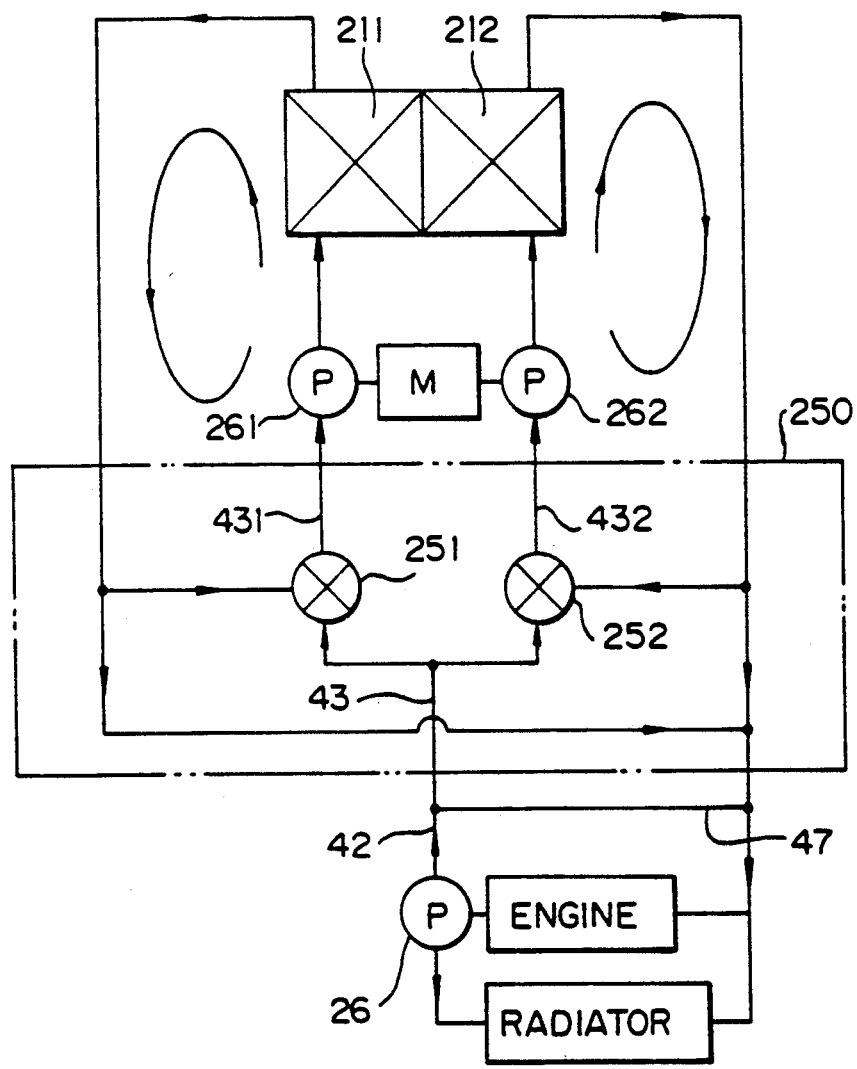
FIG. 20 is a schematic view of another embodiment of the present invention, having a pair of heater cores.

In the embodiment described above, the system is provided with only one air heating line, but the concept of the present invention can by applied to right and left, twin air heating systems controlled independently. As shown in FIG. 20, a pair of heater passageways 431 and 432 for introducing the high temperature cooling water from the engine cooling water line 42 are provided. The first heater passageway 431 is provided with a first valve device 251, a first pump 261 and a first heater core 211, and the second heater passageway 432 is provided with a second valve 252, a second pump 262, and a second heater core 212. The first and second valves 251 and 252 are subjected to an on-off control similar to that described with reference to the valve 25 in the first embodiment, and as a result, a stable air conditioning operation can be obtained for both of the air conditioning areas, even if the air conditioning loads thereof are different at the two air conditioning areas.

Figure 21:
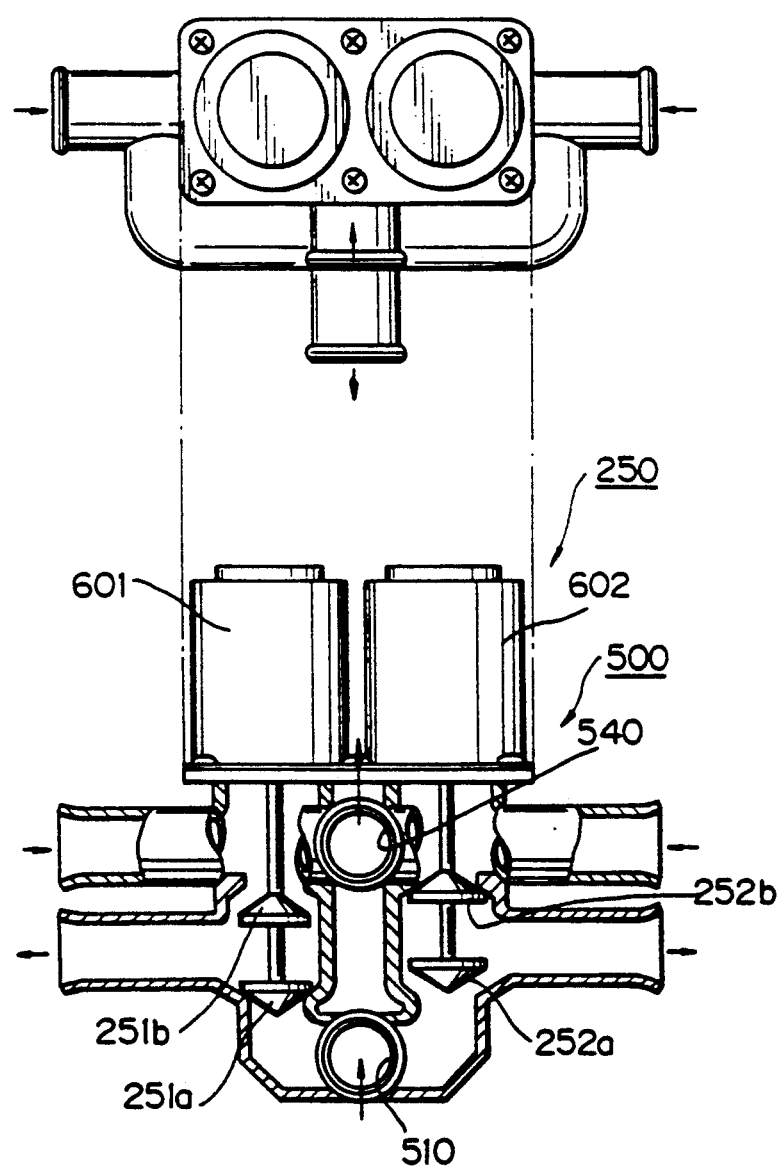
FIG. 21 shows still another embodiment of the present invention.

As shown in FIG. 21, the first valve device 251 and the second valve device 252 can be assembled in one and the same casing. In this embodiment, a pair of valve devices are connected to each other such that they are symmetrical about a vertical axis, each of the valves corresponding to the valve in FIG. 7. These valves are modified in that the first inlet 51 and the second outlet 52 are arranged perpendicular to each other, and the first outlet 52 and second inlet 52 also are arranged perpendicular to each other, but the first inlets 51 and the second outlets 54 of the left hand and right hand side valve devices are common. Namely, as shown in FIG. 21, the valve device 250 has two valve units, and has a first inlet 510 and a second outlet 540 common to the two valve units. The valve units have respective solenoids 601 and 602 operated differently for controlling the respective valve members 251a and 251b, and 252a and 252b.

We claim:

1. An air conditioning apparatus for air conditioning a cabin of an automobile having an internal combustion engine having an engine cooling water recirculation passageway, said apparatus comprising:

a duct for a flow of air having an inlet opening for an introduction of outside air and at least two outlet openings for emitting flows of air at different levels in the cabin;

at least one switching damper arranged in the duct for a selection of an opening or combination of openings from the at least two desired modes of the flow of air in the cabin;

a blower for generating a forcible flow of air in the duct;

a cooling unit arranged in the duct, for receiving the flow from the duct, and;

a heating apparatus for receiving the cooled air from the cooling unit and heating same to a desired temperature, said heating apparatus comprising:

a heater core located in said air duct in a location to allow heat exchange with the air flow, for heating the cooled air flowing from the cooling unit;

a first passageway for diverting an amount of the cooling water from said engine cooling water recirculating passageway directed to the heater core;

a water pump connected to the heater core for obtaining a forcible flow of the cooling water into the heater core;

a second passageway for re-introducing the engine cooling water that has passed through the heater core, into the engine cooling water re-circulating passageway;

a third passageway for connecting the second passageway to the first passageway at a location upstream of said water pump, for obtaining a flow of cooling water from the second passageway to the first passageway;

first valve means for controlling the flow of the cooling water in said first passageway, the first valve means having a first position allowing all of the cooling water to be introduced into the heater core, and a second position completely blocking the introduction of the cooling water into the heater core;

a fourth passageway for connecting the first passageway to the second passageway at a location upstream of the first valve means;

second valve means for controlling the flow of cooling water between the second and third passageways, the second valve means having a first position completely blocking the introduction of the cooling water that has passed through the heater core into the third passageway, and a second position allowing an amount of the cooling water that has passed through the heater core to be returned to the heater core again, via the first passageway and the third passageway, and;

means for calculating a target temperature of the air to be issued to the cabin for maintaining a set temperature determined by a passenger in the cabin, and;

means, responsive to the calculated target temperature for controlling an operation at a desired cycle, between a first state in which the first and second valve means are each at the first positions thereof to allow all of the high temperature water from the engine to be introduced into the heater core and to prevent the low temperature cooling water from being re-introduced into the heater core, and a second state in which the first and second valve means are at the second positions thereof to recirculate the low temperature water that has passed through the heater core back into the heater core, while preventing the high temperature engine cooling water from being introduced into the heater core, to thereby obtain a desired temperature of the air flowing to the cabin through the heater core; and means for detecting a position of the switching damper, means for determining if the selected mode is such that the air is directed to a lower portion of the cabin, and means for obtaining a large value of a duration of one cycle when the mode in which the air flows toward the lower position of the cabin is determined, and obtaining a smaller value of a duration of one cycle when a mode in which the air flows toward the upper position of the cabin is determined.

2. A heating apparatus arranged in an air duct of an air conditioning system for an automobile provided with an internal combustion engine having an engine cooling water re-circulation passageway, said duct being opened to a cabin of the automobile, said heating apparatus comprising:

a heater core located in said air duct in a location to allow heat exchange with the air flow, for heating the air;

a first passageway for diverting an amount of cooling water from said engine cooing water re-circulating passageway, and directing said amount of cooling water to the heater core;

a second passageway for re-introducing the amount of engine cooling water that has passed through the heater core, into the engine cooling water re-circulation passageway;

a water pump arranged in at least one of the first passageway and the second passageway for obtaining a forcible flow of the cooling water into the heater core;

a third passageway for connecting the second passageway to the first passageway at a location upstream of said water pump, for obtaining a flow of the cooling water from the second passageway to the first passageway;

first valve means for controlling the flow of the cooling water in said first passageway, the first valve means having a first position allowing all of the cooling water to be introduced into the heater core, and a second position completely blocking an introduction of the cooling water into the heater core;

second valve means controlling the flow of the cooling water between the second and third passageways, and having a first position completely blocking the introduction of cooling water that has passed through the heater core into the third passageway, and a second position allowing an amount of the cooling water that has passed through the heater core to be returned to the first passageway via the third passageway, and;

a fourth passageway for connecting the first passageway to the second passageway at a location upstream of the first valve means; said fourth passageway reducing water hammer caused by said first valve means and said second value means;

means for calculating a target temperature of the air to be issued to the cabin for maintaining a set temperature determined by a passenger in the cabin, and;

means, responsive to the calculated target temperature, for controlling an operation at a desired cycle, between a first state in which the first and second valve means are each at the first positions thereof to allow all of the high temperature water from the engine to be introduced into the heater core and to prevent the low temperature cooling water from being re-introduced into the heater core, and a second state in which the first and second valve means are each at the second positions thereof to re-circulate the low temperature water that has passed through the heater core back into the heater core, and to prevent the high temperature engine cooling water from being introduced into the heater core, the first and second valves being controlled in a unified manner such that the first and second valves are both in either the first position or in the second position to thereby obtain a desired temperature of the engine cooling water introduced into the heater core, said control means comprising: a) means, responsive to the calculated target air temperature, for calculating a duty ratio between one of the first or second states and one complete cycle equal to the duration of the first state plus the duration of the second state, and b) means for generating electric signals having the calculated duty ratio and applying same to the first and second valve means to operate the first and second valve means between the first and the second states thereof at the calculated duty ratio, and further comprising means, responsive to the calculated, target air temperature for calculating a duration of said one complete cycle which increases as the thermal load is decreased.

3. A heating apparatus arranged in an air duct of an air conditioning system for an automobile provided with an internal combustion engine having an engine cooling water re-circulation passageway, said duct being opened to a cabin of the automobile, said heating apparatus comprising:

a heater core located in said air duct in a location to allow heat exchange with the air flow, for heating the air;

a heater core located in said air duct in a location to allow heat exchange with the air flow, for heating the air;

a first passageway for diverting an amount of cooling water from said engine cooing water re-circulating passageway, and directing said amount of cooling water to the heater core;

a second passageway for re-introducing the amount of engine cooling water that has passed through the heater core, into the engine cooling water re-circulation passageway;

a water pump arranged in at least one of the first passageway and the second passageway for obtaining a forcible flow of the cooling water into the heater core;

a third passageway for connecting the second passageway to the first passageway at a location upstream of said water pump, for obtaining a flow of the cooling water from the second passageway to the first passageway;

first valve means for controlling the flow of the cooling water in said first passageway, the first valve means having a first position allowing all of the cooling water to be introduced into the heater core, and a second position completely blocking an introduction of the cooling water into the heater core;

second valve means controlling the flow of the cooling water between the second and third passageways, and having a first position completely blocking the introduction of cooling water that has passed through the heater core into the third passageway, and a second position allowing an amount of the cooling water that has passed through the heater core to be returned to the first passageway via the third passageway, and;

a fourth passageway for connecting the first passageway to the second passageway at a location upstream of the first valve means; said fourth passageway reducing water hammer caused by said first valve means and said second value means;

means for calculating a target temperature of the air to be issued to the cabin for maintaining a set temperature determined by a passenger in the cabin, and;

means, responsive to the calculated target temperature, for controlling an operation at a desired cycle, between a first state in which the first and second valve means are each at the first positions thereof to allow all of the high temperature water from the engine to be introduced into the heater core and to prevent the low temperature cooling water from being re-introduced into the heater core, and a second state in which the first and second valve means are each at the second positions thereof to re-circulate the low temperature water that has passed through the heater core back into the heater core, and to prevent the high temperature engine cooling water from being introduced into the heater core, the first and second valves being controlled in a unified manner such that the first and second valves are both in either the first position or in the second position to thereby obtain a desired temperature of the engine cooling water introduced into the heater core, said control means comprising: a) means, responsive to the calculated target air temperature, for calculating a duty ratio between one of the first or second states and one complete cycle equal to the duration of the first state plus the duration of the second state, and b) means for generating electric signals having the calculated duty ratio and applying same to the first and second valve means to operate the first and second valve means between the first and the second states thereof at the calculated duty ratio, and further comprising means for detecting an amount of air subjected to a heat exchange operation at the heater core, and means, responsive to the detected amount of the air, for calculating a duration of said one complete cycle which decreases as the amount of air is increased.

4. A heating apparatus arranged in an air duct of an air conditioning system for an automobile provided with an internal combustion engine having an engine cooling water re-circulation passageway, said duct being opened to a cabin of the automobile, said heating apparatus comprising:

a heater core located in said air duct in a location to allow heat exchange with the air flow, for heating the air;

a first passageway for diverting an amount of cooling water from said engine cooing water re-circulating passageway, and directing said amount of cooling water to the heater core;

a second passageway for re-introducing the amount of engine cooling water that has passed through the heater core, into the engine cooling water re-circulation passageway;

a water pump arranged in at least one of the first passageway and the second passageway for obtaining a forcible flow of the cooling water into the heater core;

a third passageway for connecting the second passageway to the first passageway at a location upstream of said water pump, for obtaining a flow of the cooling water from the second passageway to the first passageway;

first valve means for controlling the flow of the cooling water in said first passageway, the first valve means having a first position allowing all of the cooling water to be introduced into the heater core, and a second position completely blocking an introduction of the cooling water into the heater core;

second valve means controlling the flow of the cooling water between the second and third passageways, and having a first position completely blocking the introduction of cooling water that has passed through the heater core into the third passageway, and a second position allowing an amount of the cooling water that has passed through the heater core to be returned to the first passageway via the third passageway, and;

a fourth passageway for connecting the first passageway to the second passageway at a location upstream of the first valve means; said fourth passageway reducing water hammer caused by said first valve means and said second value means;

means for calculating a target temperature of the air to be issued to the cabin for maintaining a set temperature determined by a passenger in the cabin, and;

means, responsive to the calculated target temperature, for controlling an operation at a desired cycle, between a first state in which the first and second valve means are each at the first positions thereof to allow all of the high temperature water from the engine to be introduced into the heater core and to prevent the low temperature cooling water from being re-introduced into the heater core, and a second state in which the first and second valve means are each at the second positions thereof to re-circulate the low temperature water that has passed through the heater core back into the heater core, and to prevent the high temperature engine cooling water from being introduced into the heater core, the first and second valves being controlled in a unified manner such that the first and second valves are both in either the first position or in the second position to thereby obtain a desired temperature of the engine cooling water introduced into the heater core, said control means comprising: a) means, responsive to the calculated target air temperature, for calculating a duty ratio between one of the first or second states and one complete cycle equal to the duration of the first state plus the duration of the second state, and b) means for generating electric signals having the calculated duty ratio and applying same to the first and second valve means to operate the first and second valve means between the first and the second states thereof at the calculated duty ratio, and further comprising means for determining whether a value of the duty ratio is lower than a first predetermined value substantially equal to 0, or is larger than a second predetermined value substantially equal to 1.0, and means for setting a smaller value of a duration of one cycle when the value of the duty ratio is between the first and second values than when the value of the duty ratio is not between the first and second values.

* * * * *